(12) United States Patent
Cheng et al.

(10) Patent No.: US 11,489,991 B2
(45) Date of Patent: Nov. 1, 2022

(54) IMAGING LENS SYSTEM, CAMERA MODULE AND ELECTRONIC DEVICE

(71) Applicant: LARGAN PRECISION CO., LTD., Taichung (TW)

(72) Inventors: Jyun-Jia Cheng, Taichung (TW); Heng Yi Su, Taichung (TW); Ming-Ta Chou, Taichung (TW); Chen-Yi Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/328,794

(22) Filed: May 24, 2021

(65) Prior Publication Data

US 2022/0256059 A1 Aug. 11, 2022

Related U.S. Application Data

(60) Provisional application No. 63/147,689, filed on Feb. 9, 2021.

(51) Int. Cl.
| | |
|---|---|
| *H04N 5/225* | (2006.01) |
| *G02B 5/22* | (2006.01) |
| *G02B 1/04* | (2006.01) |
| *G03B 17/12* | (2021.01) |

(52) U.S. Cl.
CPC .......... *H04N 5/2254* (2013.01); *G02B 1/041* (2013.01); *G02B 5/22* (2013.01); *G03B 17/12* (2013.01)

(58) Field of Classification Search
CPC ........ H04N 5/2254; G02B 1/041; G02B 5/22; G03B 17/12
See application file for complete search history.

(56) References Cited

U.S. PATENT DOCUMENTS

| | | | |
|---|---|---|---|
| 7,391,457 B2 | 6/2008 | Fujimoto et al. | |
| 7,545,583 B2 | 6/2009 | Hayashi et al. | |
| 8,102,609 B2 | 1/2012 | Tsuchiya et al. | |
| 8,455,810 B2* | 6/2013 | Tomioka | G02B 27/0018 359/566 |
| 8,736,989 B2 | 5/2014 | Wu | |
| 8,885,258 B2 | 11/2014 | Matsuno et al. | |
| (Continued) | | | |

FOREIGN PATENT DOCUMENTS

| | | |
|---|---|---|
| CN | 102472837 A | 5/2012 |
| CN | 102483472 A | 5/2012 |
| (Continued) | | |

*Primary Examiner* — Amy R Hsu
(74) *Attorney, Agent, or Firm* — Maschoff Brennan

(57) ABSTRACT

An imaging lens system includes a plastic lens element, a lens barrel and a light-absorbing coating layer. The plastic lens element is accommodated in the lens barrel and has an outer annular surface. The lens barrel includes a plate portion and a lateral wall portion. An optical axis of the imaging lens system passes through a light-passable hole of the plate portion. The lateral wall portion is connected to the plate portion and extends along a direction substantially parallel to the optical axis. The light-absorbing coating layer has an inner surface and an outer surface. The inner surface faces and is fixed on the outer annular surface of the plastic lens element. The outer surface is located opposite to the inner surface and in physical contact with the lateral portion of the lens barrel.

14 Claims, 35 Drawing Sheets

(56) References Cited

U.S. PATENT DOCUMENTS

| | | |
|---|---|---|
| 8,936,371 B2 | 1/2015 | Maruyama |
| 8,958,155 B2 | 2/2015 | Kubota |
| 8,964,314 B2 | 2/2015 | Koike et al. |
| 8,975,005 B2 | 3/2015 | Shimada |
| 9,110,205 B2 | 8/2015 | Kaneko |
| 9,140,826 B2 | 9/2015 | Miyazaki et al. |
| 9,158,039 B2 | 10/2015 | Okuno et al. |
| 9,207,364 B2 | 12/2015 | Yang et al. |
| 9,554,025 B2 | 1/2017 | Dobashi |
| 9,638,832 B1 | 5/2017 | Su |
| 9,715,042 B2 * | 7/2017 | Yamamoto ............... C09D 7/67 |
| 9,952,359 B2 | 4/2018 | Chang |
| 9,952,361 B2 | 4/2018 | Higuchi et al. |
| 10,021,283 B2 | 7/2018 | Dobashi |
| 10,048,410 B2 | 8/2018 | Kubota |
| 10,101,557 B2 | 10/2018 | Tsai et al. |
| 10,114,152 B2 * | 10/2018 | Chou ..................... G02B 27/00 |
| 10,120,107 B2 | 11/2018 | Abe et al. |
| 10,240,063 B2 | 3/2019 | Kubota et al. |
| 10,564,383 B2 * | 2/2020 | Chou ................ G02B 27/0018 |
| 10,712,527 B2 | 7/2020 | Tsai et al. |
| 2010/0002107 A1 | 1/2010 | Harazono |
| 2012/0211852 A1 | 8/2012 | Iwafuchi et al. |
| 2013/0016430 A1 | 1/2013 | Ogawa et al. |
| 2014/0334019 A1 | 11/2014 | Ishiguri et al. |
| 2014/0347752 A1 | 11/2014 | Koike et al. |
| 2015/0103226 A1 | 4/2015 | Takahashi et al. |
| 2015/0103407 A1 | 4/2015 | Chen |
| 2015/0226931 A1 | 8/2015 | Huang |
| 2016/0011415 A1 | 1/2016 | Takada |
| 2019/0369355 A1 * | 12/2019 | Fukuyama ............... G02B 7/04 |
| 2020/0004012 A1 * | 1/2020 | Li ..................... G02B 27/0018 |

FOREIGN PATENT DOCUMENTS

| | | |
|---|---|---|
| CN | 102879839 A | 1/2013 |
| CN | 103314313 A | 9/2013 |
| CN | 203759336 U | 8/2014 |
| CN | 104280793 A | 1/2015 |
| CN | 104317164 A | 1/2015 |
| CN | 204389721 U | 6/2015 |
| CN | 105190390 A | 12/2015 |
| CN | 205333947 U | 6/2016 |
| CN | 206362996 U | 7/2017 |
| CN | 207216058 U | 4/2018 |
| CN | 207528948 U | 6/2018 |
| CN | 207924229 U | 9/2018 |
| CN | 207965284 U | 10/2018 |
| CN | 208172280 U | 11/2018 |
| WO | 2014/156915 A1 | 10/2014 |

* cited by examiner ial Appli- length of the inner surface of the light-absorbing coating
IMAGING LENS SYSTEM, CAMERA MODULE AND ELECTRONIC DEVICE

RELATED APPLICATIONS

This application claims priority to U.S. Provisional Application 63/147,689, filed on Feb. 9, 2021, which is incorporated by reference herein in its entirety.

BACKGROUND

Technical Field

The present disclosure relates to an imaging lens system, a camera module and an electronic device, more particularly to an imaging lens system and a camera module applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging lens system has an object side, an image side and an optical axis. The image side is opposite to the object side. The optical axis passes through the object side and the image side. The imaging lens system includes a plastic lens element, a lens barrel and a light-absorbing coating layer. The plastic lens element has an object-side surface, an image-side surface and an outer annular surface. The object-side surface faces the object side of the imaging lens system. The image-side surface faces the image side of the imaging lens system, and the image-side surface is opposite to the object-side surface. The outer annular surface is connected to the object-side surface and the image-side surface. The lens barrel has an internal space for accommodating the plastic lens element. The lens barrel comprises a plate portion and a lateral wall portion. The plate portion has a light-passable hole. The optical axis of the imaging lens system passes through the light-passable hole. The lateral wall portion is connected to the plate portion, and the lateral wall portion extends from the plate portion along a direction substantially parallel to the optical axis. The lateral wall portion corresponds to the outer annular surface of the plastic lens element. The light-absorbing coating layer is fixed on the outer annular surface of the plastic lens element and is in physical contact with the lens barrel. The light-absorbing coating layer has an inner surface and an outer surface. The inner surface faces and is fixed on the outer annular surface of the plastic lens element. The outer surface is opposite to the inner surface, and the outer surface is located farther away from the outer annular surface of the plastic lens element than the inner surface. The outer surface is in physical contact with the lateral wall portion of the lens barrel. When a length of the outer surface of the light-absorbing coating layer that is in physical contact with the lateral wall portion of the lens barrel along a direction substantially in parallel with the optical axis is LA, and a length of the inner surface of the light-absorbing coating layer along a direction substantially in parallel with the optical axis is LT, the following condition is satisfied:

$0.1 \leq LA/LT \leq 0.95$.

According to another aspect of the present disclosure, a camera module includes the aforementioned imaging lens system.

According to another aspect of the present disclosure, an electronic device includes the aforementioned camera module and an image sensor, wherein the image sensor is disposed on an image surface of the imaging lens system.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
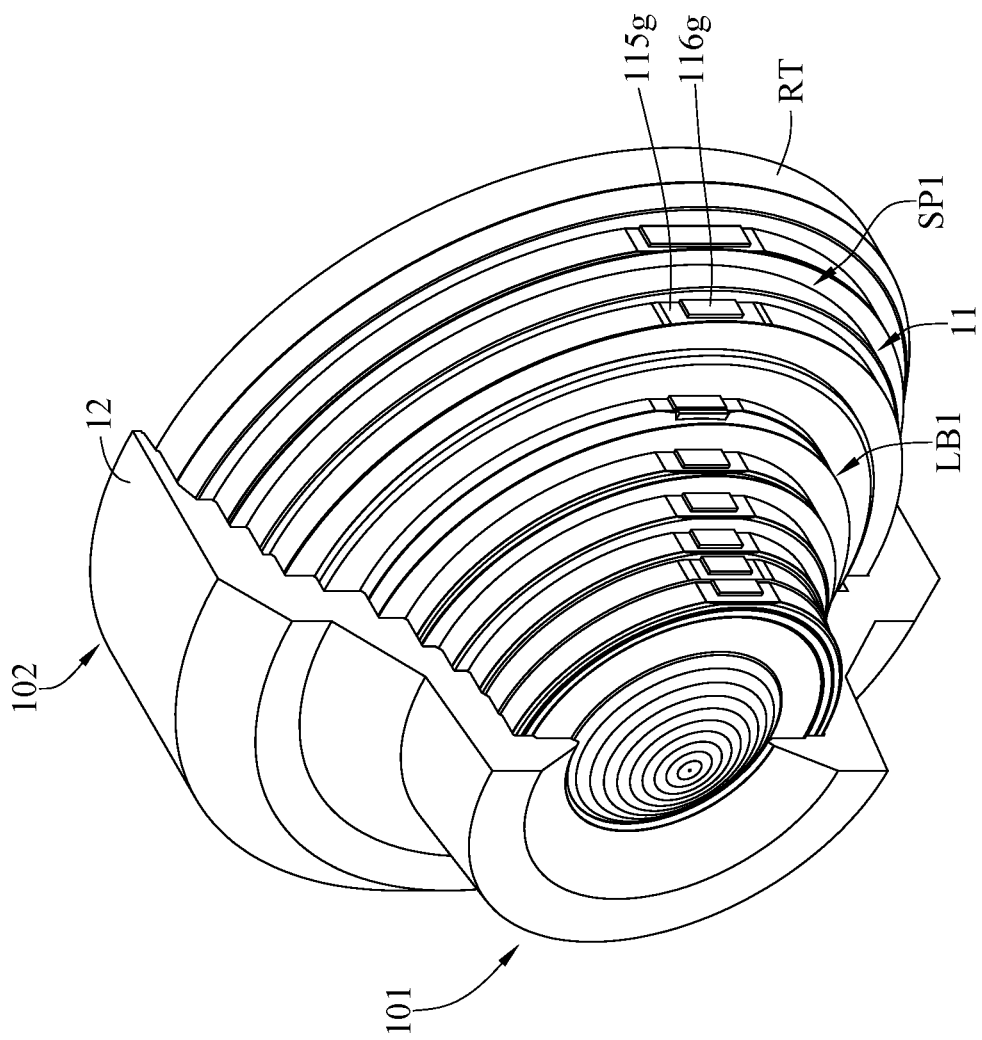
FIG. 1 is a perspective view of an imaging lens system that is partially sectioned according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system that has an object side, an image side, an image surface and an optical axis. The image side is opposite to the object side. The image surface is located close to the image side and away from the object side, and the imaging lens system images on the image surface. The optical axis passes through the object side, the image side and the image surface. The imaging lens system includes a plastic lens element, a lens barrel and a light-absorbing coating layer.

The plastic lens element has an object-side surface, an image-side surface and an outer annular surface. The object-side surface faces the object side of the imaging lens system. The image-side surface faces the image side of the imaging lens system, and the image-side surface is opposite to the object-side surface. The outer annular surface is connected to the object-side surface and the image-side surface.

The plastic lens element can include at least one axial connection structure located on at least one of the object-side surface and the image-side surface. The axial connection structure is configured to be connected to an adjacent optical element, and the axial connection structure is configured to align the adjacent optical element with the optical axis by abutting a tapered surface thereof on the adjacent optical element or by engaging a concave-convex structure with a matched concave-convex structure of the adjacent optical element. Therefore, it is favorable for satisfying concentricity requirement of the imaging lens system so as to improve assembly yield rate under narrow assembly tolerance. Moreover, the adjacent optical element may be a lens element, a light-blocking element, an aperture stop, a stop, a spacer, a retainer, etc., and the present disclosure is not limited thereto. Please refer to FIG. 8, which shows a schematic view of the axial connection structures 214a, 214b and 214c according to the 2nd embodiment of the present disclosure. Please refer to FIG. 24 and FIG. 25, which show schematic views of the axial connection structure 514a according to the 5th embodiment of the present disclosure.

The plastic lens element can have a trimmed surface located at a side thereof close to the outer annular surface. The trimmed surface is connected to the outer annular surface. A distance between the trimmed surface and the optical axis is smaller than a distance between the outer annular surface and the optical axis. The plastic lens element can include a gate trace on the trimmed surface. Therefore, it is favorable for preventing interference between the gate trace and the lens barrel so as to permit narrow assembly tolerance. Please refer to FIG. 1, which shows a schematic view of the trimmed surface 115g and the gate trace 116g according to the 1st embodiment of the present disclosure. Please refer to FIG. 24 and FIG. 27, which show schematic views of the trimmed surface 515a and the gate trace 516a according to the 5th embodiment of the present disclosure.

The lens barrel has an internal space for accommodating the plastic lens element. The lens barrel includes a plate portion and a lateral wall portion. The plate portion has a light-passable hole, and the optical axis of the imaging lens system passes through the light-passable hole. The lateral wall portion is connected to the plate portion, and the lateral wall portion extends from the plate portion along a direction substantially parallel to the optical axis. The lateral wall portion corresponds to the outer annular surface of the plastic lens element.

The light-absorbing coating layer is fixed on the outer annular surface of the plastic lens element and is in physical contact with the lens barrel. The light-absorbing coating layer can be a black ink spraying layer formed by a fast-drying ink based on epoxy resin, a blackened coating layer by chemical vapor deposition, photoresistive coating layer, etc., and the present disclosure is not limited thereto. The light-absorbing coating layer has an inner surface and an outer surface. The inner surface faces and is fixed on the outer annular surface of the plastic lens element. The outer surface is opposite to the inner surface, and the outer surface is located farther away from the outer annular surface of the plastic lens element than the inner surface. The outer surface is in physical contact with the lateral wall portion of the lens barrel.

The light-absorbing coating layer can extend from the outer annular surface to the axial connection structure of the plastic lens element, and the inner surface of the light-absorbing coating layer can be fixed on the axial connection structure. By fixing the light-absorbing coating layer to the axial connection structure, the light-absorbing coating layer can be aligned with and in physical contact with the adjacent optical element, thereby preventing non-imaging light from emitting from a joint between the plastic lens element and the adjacent optical element via the axial connection structure, and also obtaining a proper balance between the overall concentricity requirement of the imaging lens system and the light-blocking requirement of the axial connection structure. Please refer to FIG. 8, which shows a schematic view of the light-absorbing coating layer 23b extending from the outer annular surface 213b to the axial connection structure 214b of the second lens element 21b according to the 2nd embodiment of the present disclosure.

The light-absorbing coating layer can extend from the outer annular surface to the object-side surface and the image-side surface of the plastic lens element, and the inner surface of the light-absorbing coating layer can be fixed on the object-side surface and the image-side surface. Therefore, it is favorable for extending the light-blocking range of the light-absorbing coating layer so as to replace the same light-blocking function of an adjacent optical element, thereby reducing manufacturing cost. Please refer to FIG. 8 and FIG. 10, which show schematic views of the light-absorbing coating layer 23b extending from the outer annular surface 213b to the object-side surface 211b and the image-side surface 212b of the second lens element 21b according to the 2nd embodiment of the present disclosure.

The light-absorbing coating layer can extend from the outer annular surface to one of the object-side surface and the image-side surface of the plastic lens element, and the inner surface of the light-absorbing coating layer can be fixed on the one of the object-side surface and the image-side surface. Therefore, it is favorable for extending the light-blocking range of the light-absorbing coating layer so as to ensure the stray light blocking efficiency out of the optical effective area. Please refer to FIG. 5 and FIG. 6, which show schematic views of the light-absorbing coating layer 13g extending from the outer annular surface 113g to the object-side surface 111g of the seventh lens element 11g according to the 1st embodiment of the present disclosure. Please refer to FIG. 19 and FIG. 20, which show schematic views of the light-absorbing coating layer 43h extending from the outer annular surface 413h to the image-side surface 412h of the eighth lens element 41h according to the 4th embodiment of the present disclosure. Please refer to FIG. 30 and FIG. 31, which show schematic views of the light-absorbing coating layer 63b extending from the outer annular surface 613b to the image-side surface 612b of the second lens element 61b according to the 6th embodiment of the present disclosure.

The light-absorbing coating layer can extend from the outer annular surface of the plastic lens element and can be fixed on at least one of the object-side surface and the image-side surface of the plastic lens element, and the outer surface at a section of the light-absorbing coating layer fixed on the at least one of the object-side surface and the image-side surface of the plastic lens element can be in physical contact with an adjacent optical element. Therefore, it is favorable for satisfying the light-blocking requirement in optical design so as to increase image clarity.

When a length of the outer surface of the light-absorbing coating layer that is in physical contact with the lateral wall portion of the lens barrel along a direction substantially in parallel with the optical axis is LA, and a length of the inner surface of the light-absorbing coating layer along a direction substantially in parallel with the optical axis is LT, the following condition is satisfied: $0.1 \leq LA/LT \leq 0.95$. Please refer to FIG. 5, which shows a schematic view of LA and LT according to the 1st embodiment of the present disclosure.

When the light-absorbing coating layer is in physical contact with the lateral wall portion of the lens barrel by fixing the light-absorbing coating layer on the outer annular surface of the plastic lens element, and the abovementioned condition of LA/LT is satisfied, it is favorable for reducing the intensity of non-imaging light reflected off the outer annular surface so as to improve image quality. Also, it is favorable for providing tolerance adjustment between the outer annular surface of the plastic lens element and the lens barrel in the assembling process of the imaging lens system through the thickness of the light-absorbing coating layer that is in physical contact with the lens barrel, thereby increasing assembly yield rate.

When a minimum thickness of a section of the light-absorbing coating layer fixed on the outer annular surface of the plastic lens element is dA1, and a thickness of a section of the light-absorbing coating layer fixed on the object-side surface or the image-side surface of the plastic lens element is dC, the following condition can be satisfied: $0.97 < dA1/dC \leq 2.5$. Therefore, it is favorable for precisely controlling the ratio range of the thickness of the light-absorbing coating layer. Please refer to FIG. 5 and FIG. 6, which show schematic views of dA1 and dC according to the 1st embodiment of the present disclosure.

When the minimum thickness of the section of the light-absorbing coating layer fixed on the outer annular surface of the plastic lens element is dA1, a maximum thickness of the section of the light-absorbing coating layer fixed on the outer annular surface of the plastic lens element is dA2, a difference between the maximum thickness dA2 and the minimum thickness dA1 is ΔdA, and the thickness of the section of the light-absorbing coating layer fixed on the object-side surface or the image-side surface of the plastic lens element is dC, the following condition can be satisfied: $0.03 < \Delta dA/dC < 0.79$. Therefore, it is favorable for increasing the controllability range of the light-absorbing coating layer in the manufacturing process. Please refer to FIG. 5 and FIG. 6, which show schematic views of dA1, dA2 and dC according to the 1st embodiment of the present disclosure.

When the minimum thickness of the section of the light-absorbing coating layer fixed on the outer annular surface of the plastic lens element is dA1, the maximum thickness of the section of the light-absorbing coating layer fixed on the outer annular surface of the plastic lens element is dA2, and the difference between the maximum thickness dA2 and the minimum thickness dA1 is ΔdA, the following condition can be satisfied: $0.1 \text{ [um]} < \Delta dA < dA1$. Therefore, it is favorable for ensuring the thickness deviation of the light-absorbing coating layer in the manufacturing process, thereby increasing manufacturing yield rate.

When the minimum thickness of the section of the light-absorbing coating layer fixed on the outer annular surface of the plastic lens element is dA1, the maximum thickness of the section of the light-absorbing coating layer fixed on the outer annular surface of the plastic lens element is dA2, and the difference between the maximum thickness dA2 and the minimum thickness dA1 is ΔdA, the following condition can be satisfied: $0.03 < \Delta dA/dA1 < 0.99$. Therefore, it is favorable for further increasing the controllability range of the light-absorbing coating layer in the manufacturing process.

According to the present disclosure, the imaging lens system can further include an auxiliary light-absorbing coating layer. The auxiliary light-absorbing coating layer has an inner surface and an outer surface. The inner surface of the auxiliary light-absorbing coating layer can be fixed on the gate trace, and the outer surface of the auxiliary light-absorbing coating layer is spaced apart from the lens barrel. Therefore, it is favorable for satisfying the light-blocking requirement at the position of the gate trace so as to increase optical quality. Please refer to FIG. 27 and FIG. 28, which show schematic views of the auxiliary light-absorbing coating layer 54 according to the 5th embodiment of the present disclosure, wherein the inner surface 541 of the auxiliary light-absorbing coating layer 54 is fixed on the gate trace 516a, and the outer surface 542 of the auxiliary light-absorbing coating layer 54 is spaced apart from the lens barrel 52.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
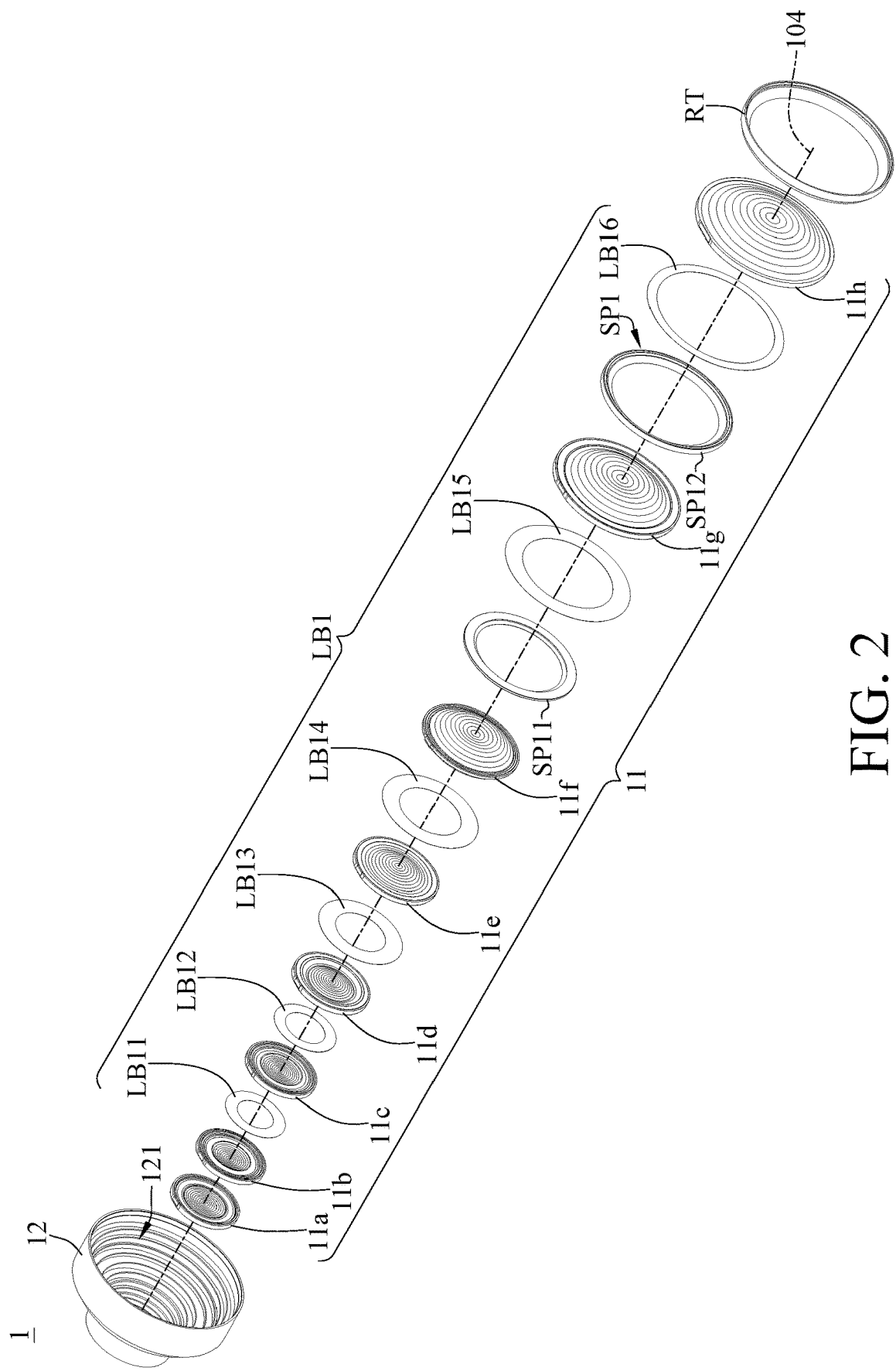
FIG. 2 is an exploded view of the imaging lens system in FIG. 1.
Figure 3:
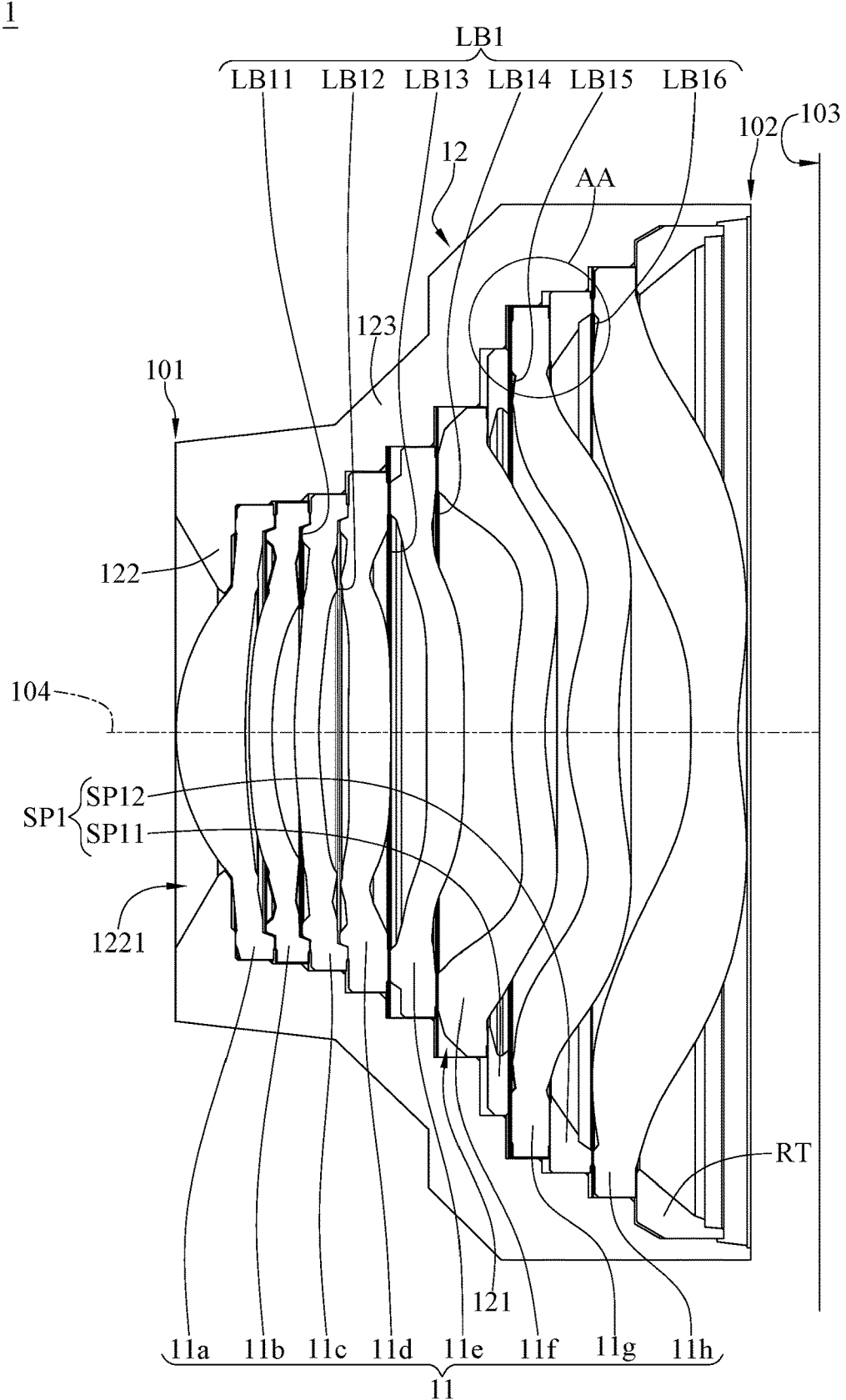
FIG. 3 is a cross-sectional view of the imaging lens system in FIG. 2.
Figure 4:
FIG. 4 is a cross-sectional view of a seventh lens element of the imaging lens system in FIG. 3.
Figure 5:
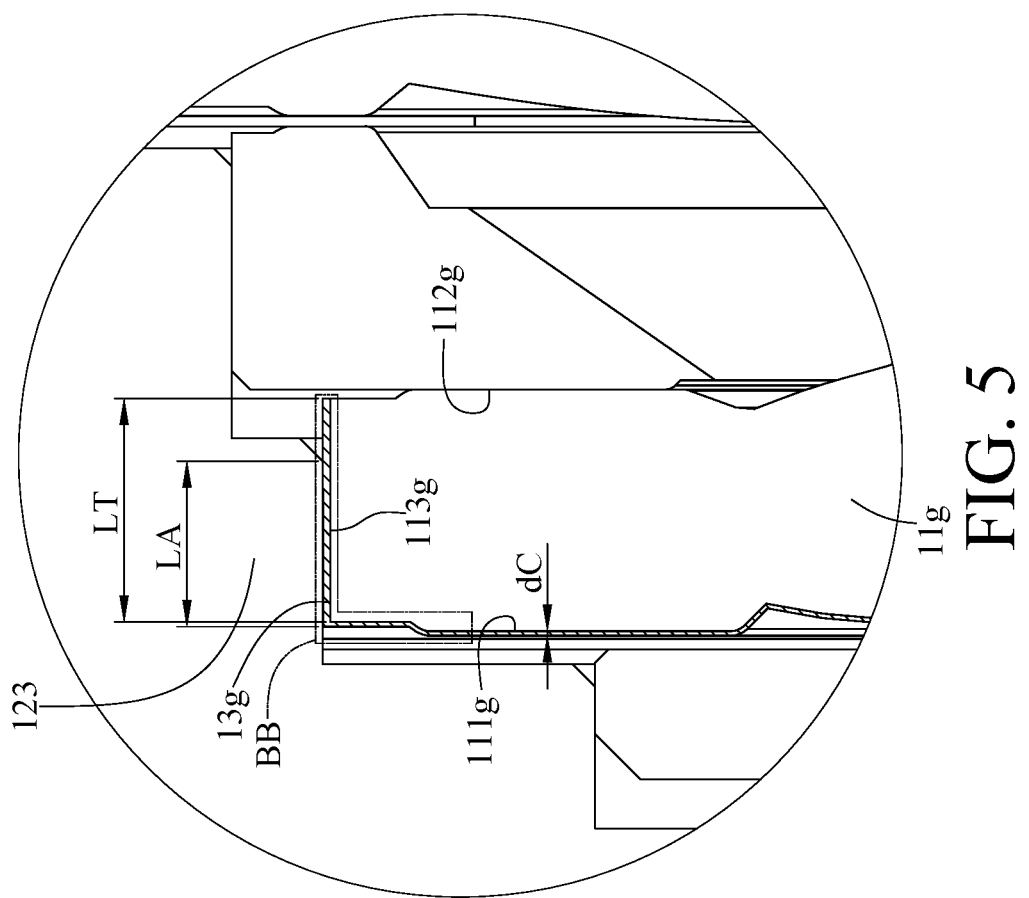
FIG. 5 is an enlarged view of the AA region of the imaging lens system in FIG. 3.
Figure 6:
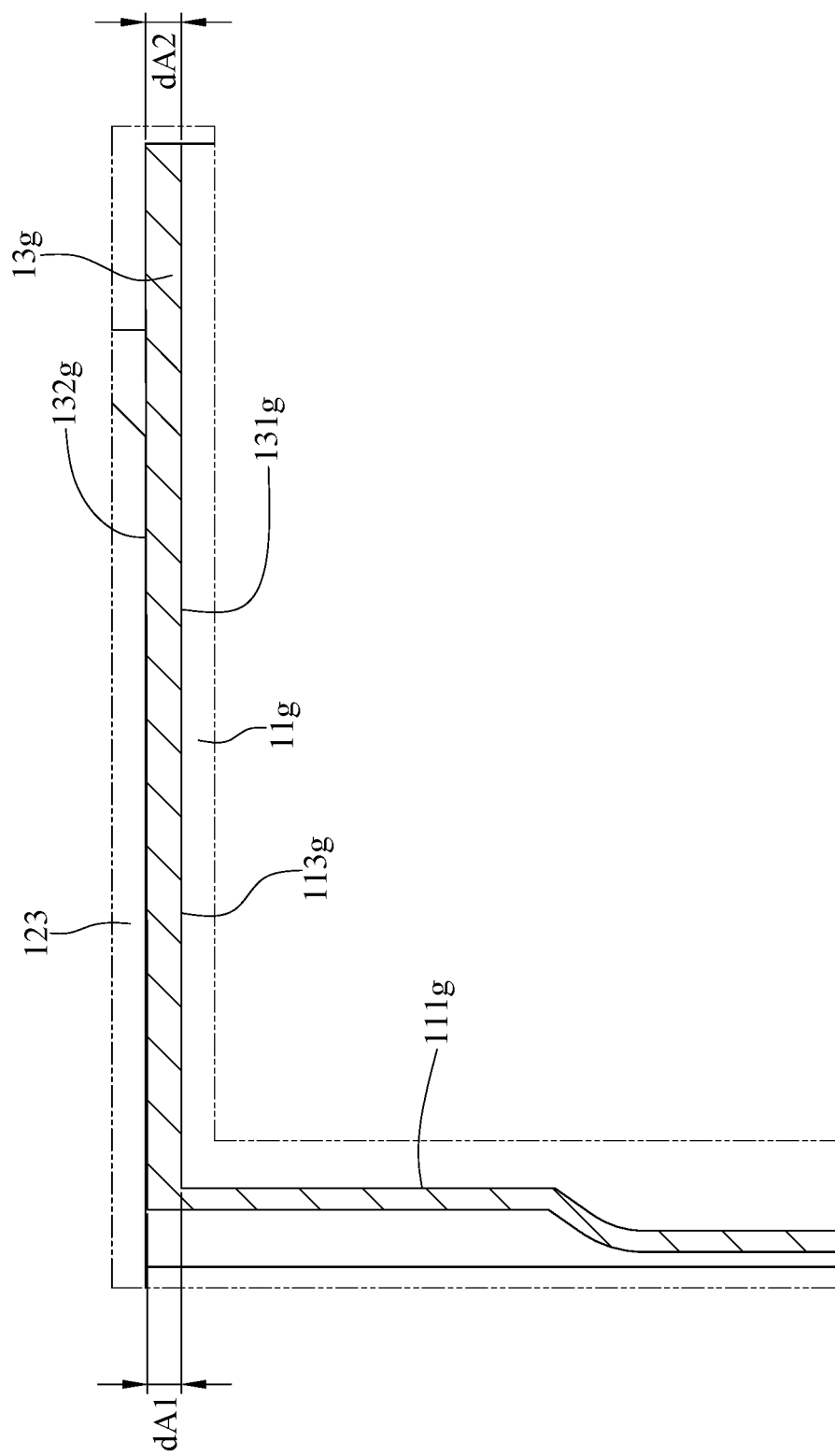
FIG. 6 is an enlarged view of the BB region of the imaging lens system in FIG. 5.

Please refer to FIG. 1 to FIG. 6, where FIG. 1 is a perspective view of an imaging lens system that is partially sectioned according to the 1st embodiment of the present disclosure, FIG. 2 is an exploded view of the imaging lens system in FIG. 1, FIG. 3 is a cross-sectional view of the imaging lens system in FIG. 2, FIG. 4 is a cross-sectional view of a seventh lens element of the imaging lens system in FIG. 3, FIG. 5 is an enlarged view of the AA region of the imaging lens system in FIG. 3, and FIG. 6 is an enlarged view of the BB region of the imaging lens system in FIG. 5.

This embodiment provides an imaging lens system 1 that has an object side 101, an image side 102, an image surface 103 and an optical axis 104. The image side 102 is opposite to the object side 101. The image surface 103 is located close to the image side 102 and away from the object side 101, and the imaging lens system 1 images on the image surface 103. The optical axis 104 passes through the object side 101, the image side 102 and the image surface 103. The imaging lens system 1 includes a plurality of plastic lens elements 11, a plurality of light-blocking elements LB1, a plurality of spacers SP1, a retainer RT, a lens barrel 12 and a light-absorbing coating layer 13g.

The plastic lens elements 11 include a first lens element 11a, a second lens element 11b, a third lens element 11c, a fourth lens element 11d, a fifth lens element 11e, a sixth lens element 11f, a seventh lens element 11g and an eighth lens element 11h. The light-blocking elements LB1 include a first light-blocking element LB11, a second light-blocking element LB12, a third light-blocking element LB13, a fourth light-blocking element LB14, a fifth light-blocking element LB15 and a sixth light-blocking element LB16. The spacers SP1 include a first spacer SP11 and a second spacer SP12. The plastic lens elements 11, the light-blocking elements LB1, the spacers SP1 and the retainer RT are arranged along a direction in parallel with the optical axis 104 in order from the object side 101 to the image side 102 as follows: the first lens element 11a, the second lens element 11b, the first light-blocking element LB11, the third lens element 11c, the second light-blocking element LB12, the fourth lens element 11d, the third light-blocking element LB13, the fifth lens element 11e, the fourth light-blocking element LB14, the sixth lens element 11f, the first spacer SP11, the fifth light-blocking element LB15, the seventh lens element 11g, the second spacer SP12, the sixth light-blocking element LB16, the eighth lens element 11h and the retainer RT.

The seventh lens element 11g has an object-side surface 111g, an image-side surface 112g and an outer annular surface 113g. The object-side surface 111g faces the object side 101 of the imaging lens system 1. The image-side surface 112g faces the image side 102 of the imaging lens system 1, and the image-side surface 112g is opposite to the object-side surface 111g. The outer annular surface 113g is connected to the object-side surface 111g and the image-side surface 112g.

The seventh lens element 11g has a trimmed surface 115g located at a side thereof close to the outer annular surface 113g. The trimmed surface 115g is connected to the outer annular surface 113g. A distance between the trimmed surface 115g and the optical axis 104 is smaller than a distance between the outer annular surface 113g and the optical axis 104. The seventh lens element 11g further includes a gate trace 116g on the trimmed surface 115g.

The lens barrel 12 has an internal space 121 for accommodating the plastic lens elements 11, the light-blocking elements LB1, the spacers SP1 and the retainer RT. The lens barrel 12 includes a plate portion 122 and a lateral wall portion 123. The plate portion 122 is located close to the object side 101 of the imaging lens system 1. The plate portion 112 has a light-passable hole 1221, and the optical axis 104 of the imaging lens system 1 passes through the light-passable hole 1221. The lateral wall portion 123 is located close to the image side 102 of the imaging lens system 1. The lateral wall portion 123 is connected to the plate portion 122, and the lateral wall portion 123 extends from the plate portion 122 along a direction substantially parallel to the optical axis 104. The lateral wall portion 123 has a plurality of step surfaces (not numbered) at a side thereof close to the internal space 121, and the step surfaces correspond to the outer annular surface 113g of the seventh lens element 11g and outer annular surfaces (not numbered) of the other plastic lens elements 11a, 11b, 11c, 11d, 11e, 11f and 11h.

The light-absorbing coating layer 13g is fixed on the outer annular surface 113g of the seventh lens element 11g and is in physical contact with the lens barrel 12. The light-absorbing coating layer 13g has an inner surface 131g and an outer surface 132g. The inner surface 131g faces and is fixed on the outer annular surface 113g of the seventh lens element 11g. The outer surface 132g is opposite to the inner surface 131g, and the outer surface 132g is located farther away from the outer annular surface 113g of the seventh lens element 11g than the inner surface 131g. The outer surface 132g is in physical contact with the lateral wall portion 123 of the lens barrel 12.

The light-absorbing coating layer 13g extends from the outer annular surface 113g to the object-side surface 111g of the seventh lens element 11g, and some amount of the inner surface 131g of the light-absorbing coating layer 13g is fixed on the object-side surface 111g. The outer surface 132g at a section of the light-absorbing coating layer 13g fixed on the object-side surface 111g of the seventh lens element 11g is in physical contact with the fifth light-blocking element LB15.

When a length of the outer surface 132g of the light-absorbing coating layer 13g that is in physical contact with the lateral wall portion 123 of the lens barrel 12 along a direction substantially in parallel with the optical axis 104 is LA, and a length of the inner surface 131g of a section of the light-absorbing coating layer 13g fixed on the outer annular surface 113g of the seventh lens element 11g along a direction substantially in parallel with the optical axis 104 is LT, the following conditions are satisfied: LA=0.36 [mm]; LT=0.49 [mm]; and LA/LT=0.73.

When a minimum thickness of a section of the light-absorbing coating layer 13g fixed on the outer annular surface 113g of the seventh lens element 11g is dA1, a maximum thickness of the section of the light-absorbing coating layer 13g fixed on the outer annular surface 113g of the seventh lens element 11g is dA2, a difference between the maximum thickness dA2 and the minimum thickness dA1 is ΔdA, and a thickness of a section of the light-absorbing coating layer 13g fixed on the object-side surface 111g of the seventh lens element 11g is dC, the following conditions are satisfied: dA1=0.016 [mm]; dA2=0.017 [mm]; ΔdA=0.001 [mm]=1 [um]; dC=0.01 [mm]; dA1/dC=1.60; ΔdA<dA1; ΔdA/dA1=0.06; and ΔdA/dC=0.10.

In the description of this embodiment, the light-absorbing coating layer 13g is exemplarily disposed on the seventh lens element 11g, and the present disclosure is not limited thereto. In some other embodiments, the light-absorbing coating layer may be disposed on any one of the other plastic lens elements. Also, in the description of this embodiment, the trimmed surface 115g and the gate trace 116g of the seventh lens element 11g are only exemplary, and the present disclosure is not limited thereto. In some other embodiments, any one of the other plastic lens elements may have a trimmed surface and a gate trace.

2nd Embodiment

Figure 7:
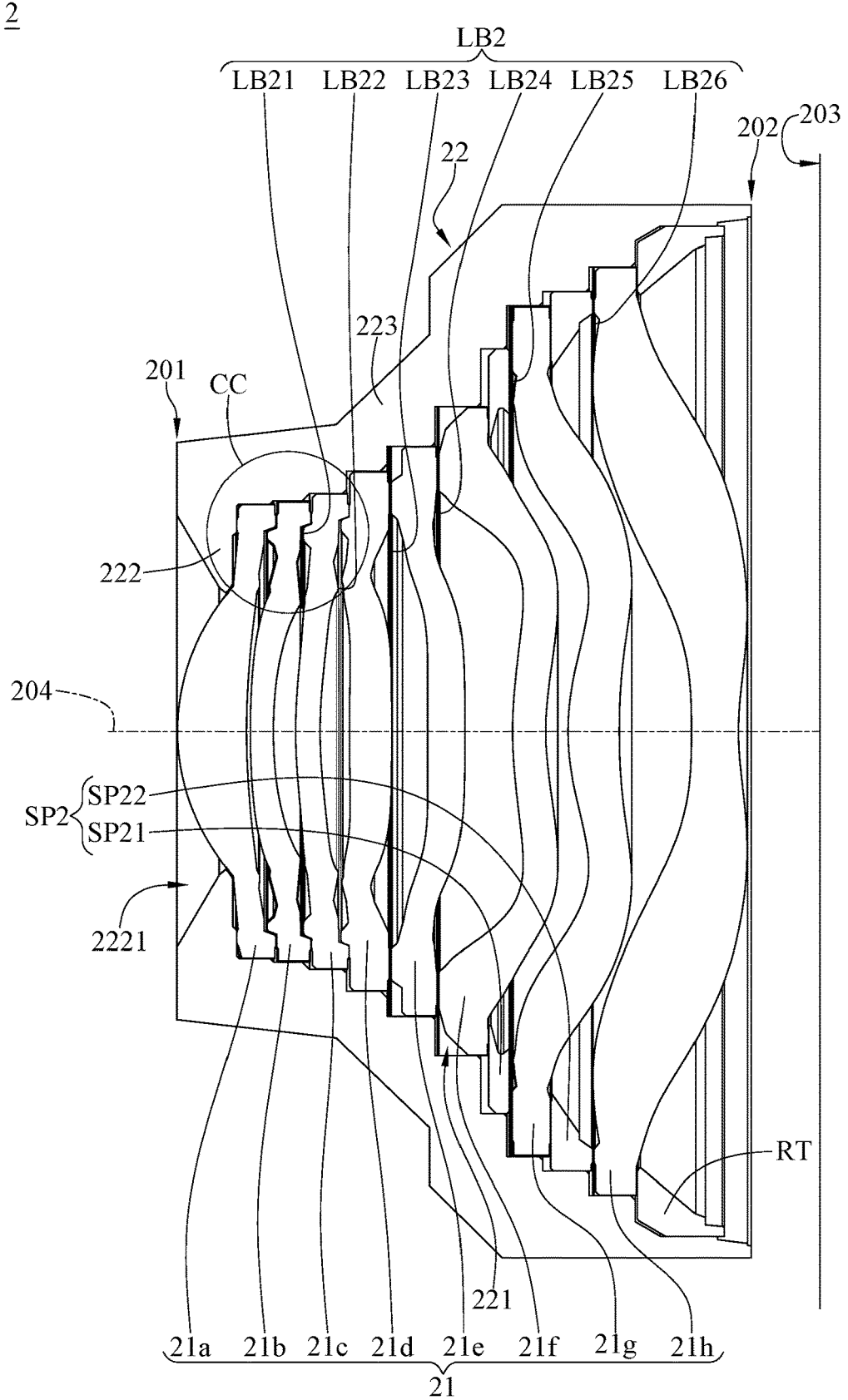
FIG. 7 is a cross-sectional view of an imaging lens system according to the 2nd embodiment of the present disclosure.
Figure 8:
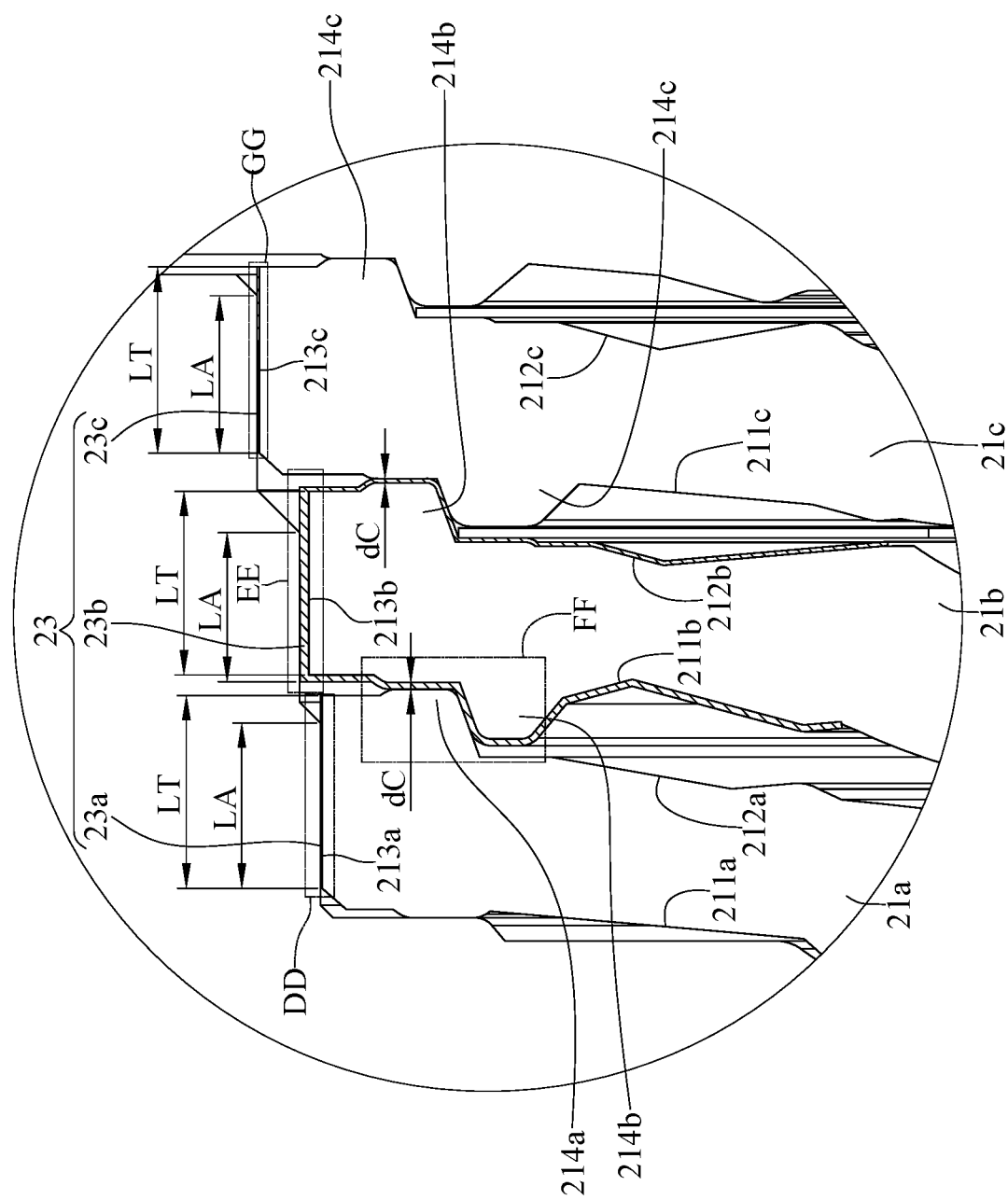
FIG. 8 is an enlarged view of the CC region of the imaging lens system in FIG. 7.
Figure 9:
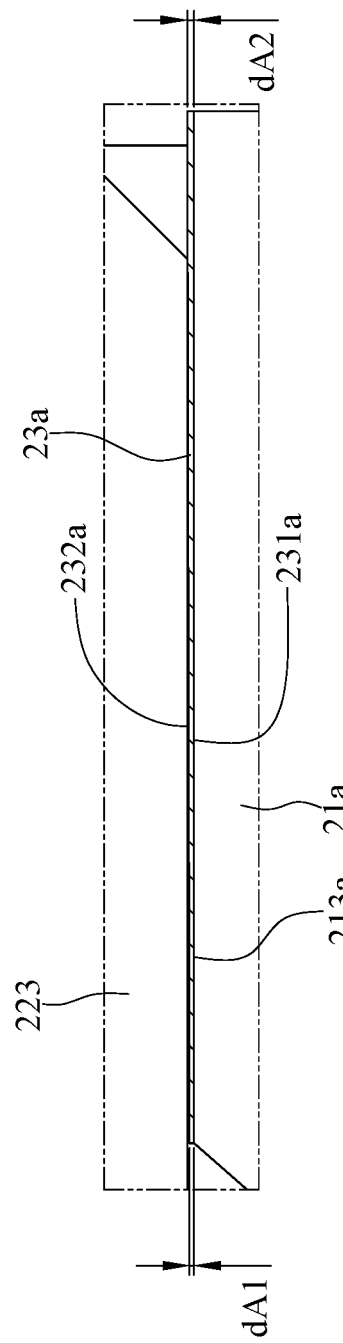
FIG. 9 is an enlarged view of the DD region of the imaging lens system in FIG. 8.
Figure 10:
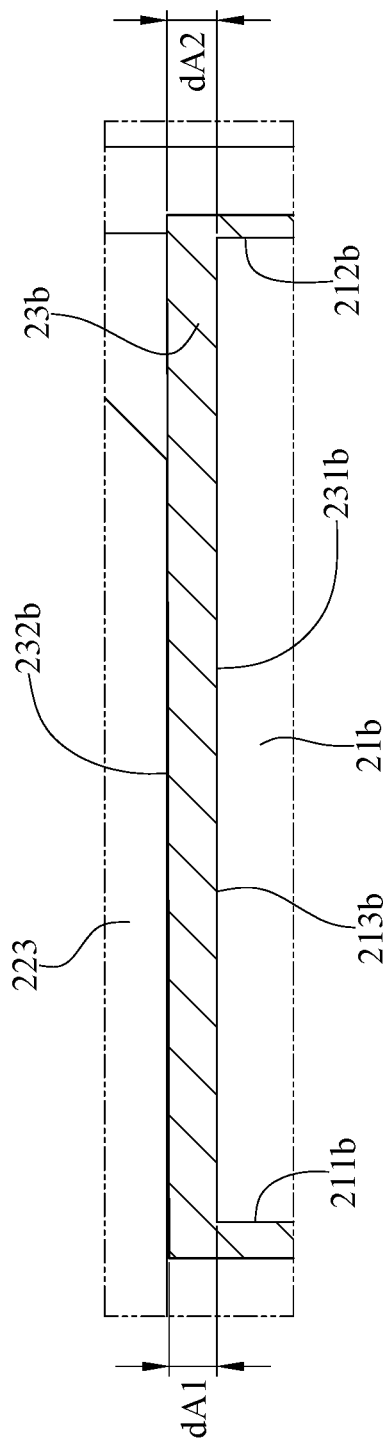
FIG. 10 is an enlarged view of the EE region of the imaging lens system in FIG. 8.
Figure 11:
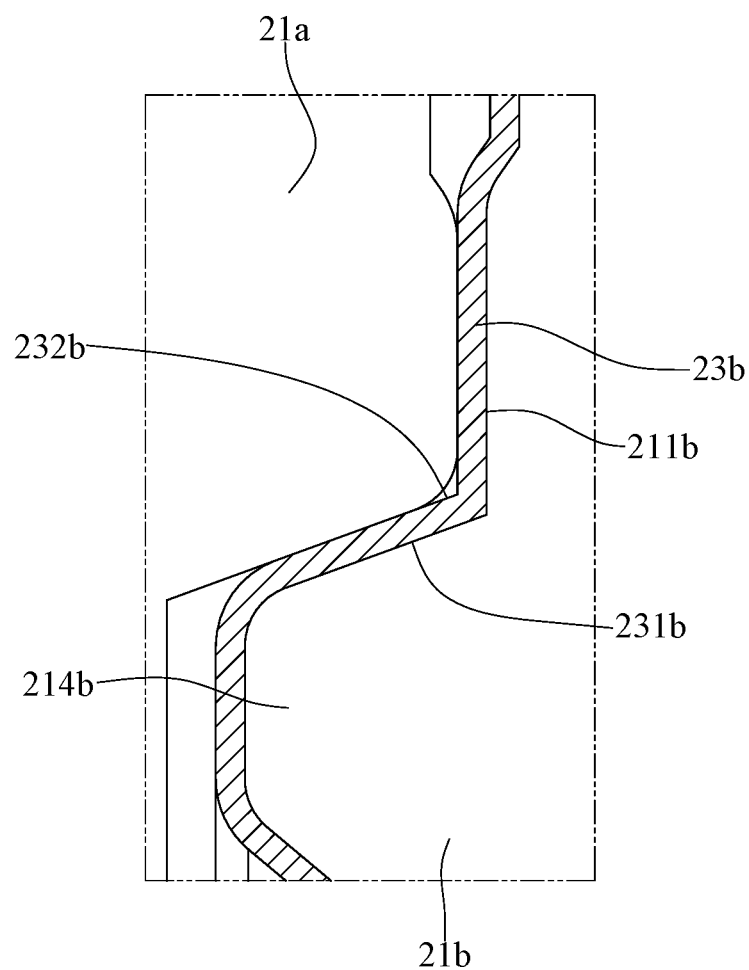
FIG. 11 is an enlarged view of the FF region of the imaging lens system in FIG. 8.
Figure 12:
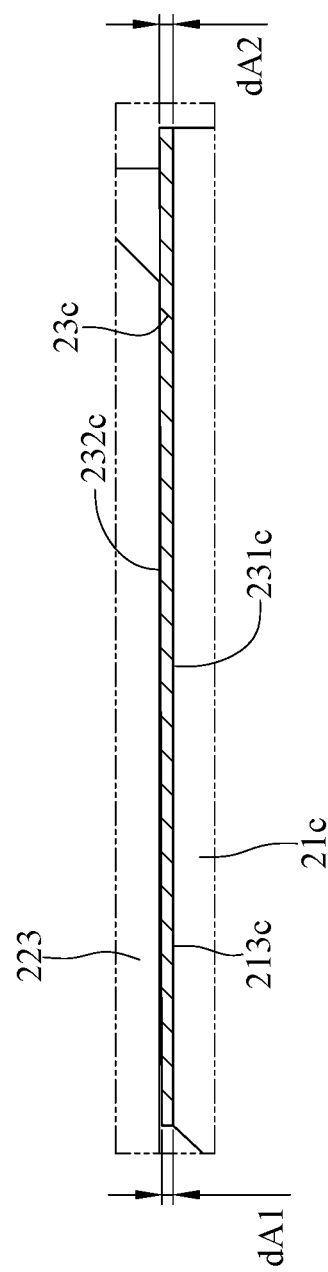
FIG. 12 is an enlarged view of the GG region of the imaging lens system in FIG. 8.

Please refer to FIG. 7 to FIG. 12, where FIG. 7 is a cross-sectional view of an imaging lens system according to the 2nd embodiment of the present disclosure, FIG. 8 is an enlarged view of the CC region of the imaging lens system in FIG. 7, FIG. 9 is an enlarged view of the DD region of the imaging lens system in FIG. 8, FIG. 10 is an enlarged view of the EE region of the imaging lens system in FIG. 8, FIG. 11 is an enlarged view of the FF region of the imaging lens system in FIG. 8, and FIG. 12 is an enlarged view of the GG region of the imaging lens system in FIG. 8.

This embodiment provides an imaging lens system 2 that has an object side 201, an image side 202, an image surface 203 and an optical axis 204. The image side 202 is opposite to the object side 201. The image surface 203 is located close to the image side 202 and away from the object side 201, and the imaging lens system 2 images on the image surface 203. The optical axis 204 passes through the object side 201, the image side 202 and the image surface 203. The imaging lens system 2 includes a plurality of plastic lens elements 21, a plurality of light-blocking elements LB2, a plurality of spacers SP2, a retainer RT, a lens barrel 22 and a plurality of light-absorbing coating layers 23.

The plastic lens elements 21 include a first lens element 21a, a second lens element 21b, a third lens element 21c, a fourth lens element 21d, a fifth lens element 21e, a sixth lens element 21f, a seventh lens element 21g and an eighth lens element 21h. The light-blocking elements LB2 include a first light-blocking element LB21, a second light-blocking element LB22, a third light-blocking element LB23, a fourth light-blocking element LB24, a fifth light-blocking element LB25 and a sixth light-blocking element LB26. The spacers SP2 include a first spacer SP21 and a second spacer SP22. The plastic lens elements 21, the light-blocking elements LB2, the spacers SP2 and the retainer RT are arranged along a direction in parallel with the optical axis 204 in order from the object side 201 to the image side 202 as follows: the first lens element 21a, the second lens element 21b, the first light-blocking element LB21, the third lens element 21c, the second light-blocking element LB22, the fourth lens element 21d, the third light-blocking element LB23, the fifth lens element 21e, the fourth light-blocking element LB24, the sixth lens element 21f, the first spacer SP21, the fifth light-blocking element LB25, the seventh lens element 21g, the second spacer SP22, the sixth light-blocking element LB26, the eighth lens element 21h and the retainer RT.

The first lens element 21a has an object-side surface 211a, an image-side surface 212a and an outer annular surface 213a. The object-side surface 211a faces the object side 201 of the imaging lens system 2. The image-side surface 212a faces the image side 202 of the imaging lens system 2, and the image-side surface 212a is opposite to the object-side surface 211a. The outer annular surface 213a is connected to the object-side surface 211a and the image-side surface 212a.

The first lens element 21a includes an axial connection structure 214a located on the image-side surface 212a. The axial connection structure 214a is connected to the second lens element 21b.

The second lens element 21b has an object-side surface 211b, an image-side surface 212b and an outer annular surface 213b. The object-side surface 211b faces the object side 201 of the imaging lens system 2. The image-side surface 212b faces the image side 202 of the imaging lens system 2, and the image-side surface 212b is opposite to the object-side surface 211b. The outer annular surface 213b is connected to the object-side surface 211b and the image-side surface 212b.

The second lens element 21b includes two axial connection structures 214b respectively located on the object-side surface 211b and the image-side surface 212b. The axial connection structures 214b are connected to the first lens element 21a, the first light-blocking element LB21 and the third lens element 21c. The axial connection structure 214a of the first lens element 21a is engaged with one of the axial connection structures 214b that is located on the object-side surface 211b of the second lens element 21b, such that the first lens element 21a and the second lens element 21b are aligned with the optical axis 204.

The third lens element 21c has an object-side surface 211c, an image-side surface 212c and an outer annular surface 213c. The object-side surface 211c faces the object side 201 of the imaging lens system 2. The image-side surface 212c faces the image side 202 of the imaging lens system 2, and the image-side surface 212c is opposite to the object-side surface 211c. The outer annular surface 213c is connected to the object-side surface 211c and the image-side surface 212c.

The third lens element 21c includes two axial connection structures 214c respectively located on the object-side surface 211c and the image-side surface 212c. The axial connection structures 214c are connected to the first light-blocking element LB21, the second lens element 21b, the second light-blocking element LB22 and the fourth lens element 21d. One of the axial connection structures 214b that is located on the image-side surface 212b of the second lens element 21b is engaged with the outer edge of the first light-blocking element LB21 and one of the axial connection structures 214c that is located on the object-side surface 211c of the third lens element 21c, such that the second lens element 21b, the first light-blocking element LB21 and the third lens element 21c are aligned with the optical axis 204. One of the axial connection structures 214c that is located on the image-side surface 212c of the third lens element 21c is engaged with the outer edge of the second light-blocking element LB22 and the fourth lens element 21d, such that the third lens element 21c, the second light-blocking element LB22 and the fourth lens element 21d are aligned with the optical axis 204.

The lens barrel 22 has an internal space 221 for accommodating the plastic lens elements 21, the light-blocking elements LB2, the spacers SP2 and the retainer RT. The lens barrel 22 includes a plate portion 222 and a lateral wall portion 223. The plate portion 222 is located close to the object side 201 of the imaging lens system 2. The plate portion 222 has a light-passable hole 2221, and the optical axis 204 of the imaging lens system 2 passes through the light-passable hole 2221. The lateral wall portion 223 is located close to the image side 202 of the imaging lens system 2. The lateral wall portion 223 is connected to the plate portion 222, and the lateral wall portion 223 extends from the plate portion 222 along a direction substantially parallel to the optical axis 204. The lateral wall portion 223 has a plurality of step surfaces (not numbered) at a side thereof close to the internal space 221, and the step surfaces correspond to the outer annular surface 213a of the first lens element 21a, the outer annular surface 213b of the second lens element 21b, the outer annular surface 213c of the third lens element 21c and outer annular surfaces (not numbered) of the other plastic lens elements 21d, 21e, 21f, 21g and 21h.

The light-absorbing coating layers 23 include a light-absorbing coating layer 23a, a light-absorbing coating layer 23b and a light-absorbing coating layer 23c.

The light-absorbing coating layer 23a is fixed on the outer annular surface 213a of the first lens element 21a and is in physical contact with the lens barrel 22. The light-absorbing coating layer 23a has an inner surface 231a and an outer surface 232a. The inner surface 231a faces and is fixed on the outer annular surface 213a of the first lens element 21a. The outer surface 232a is opposite to the inner surface 231a, and the outer surface 232a is located farther away from the outer annular surface 213a of the first lens element 21a than the inner surface 231a. The outer surface 232a is in physical contact with the lateral wall portion 223 of the lens barrel 22.

When a length of the outer surface 232a of the light-absorbing coating layer 23a that is in physical contact with the lateral wall portion 223 of the lens barrel 22 along a direction substantially in parallel with the optical axis 204 is LA, and a length of the inner surface 231a of a section of the light-absorbing coating layer 23a fixed on the outer annular surface 213a of the first lens element 21a along a direction substantially in parallel with the optical axis 204 is LT, the following conditions are satisfied: LA=0.39 [mm]; LT=0.46 [mm]; and LA/LT=0.85.

When a minimum thickness of a section of the light-absorbing coating layer 23a fixed on the outer annular surface 213a of the first lens element 21a is dA1, a maximum thickness of the section of the light-absorbing coating layer 23a fixed on the outer annular surface 213a of the first lens element 21a is dA2, and a difference between the maximum thickness dA2 and the minimum thickness dA1 is ΔdA, the following conditions are satisfied: dA1=0.002 [mm]; dA2=0.003 [mm]; ΔdA=0.001 [mm]=1 [um]; ΔdA<dA1; and ΔdA/dA1=0.50.

The light-absorbing coating layer 23b is fixed on the outer annular surface 213b of the second lens element 21b and is in physical contact with the lens barrel 22. The light-absorbing coating layer 23b has an inner surface 231b and an outer surface 232b. The inner surface 231b faces and is fixed on the outer annular surface 213b of the second lens element 21b. The outer surface 232b is opposite to the inner surface 231b, and the outer surface 232b is located farther away from the outer annular surface 213b of the second lens element 21b than the inner surface 231b. The outer surface 232b is in physical contact with the lateral wall portion 223 of the lens barrel 22.

The light-absorbing coating layer 23b extends from the outer annular surface 213b to the object-side surface 211b, the image-side surface 212b and the axial connection structures 214b located on the object-side surface 211b and the image-side surface 212b of the second lens element 21b, and some amount of the inner surface 231b of the light-absorbing coating layer 23b is fixed on the object-side surface 211b, the image-side surface 212b and the axial connection structures 214b located on the object-side surface 211b and the image-side surface 212b. The outer surface 232b at a section of the light-absorbing coating layer 23b fixed on the object-side surface 211b of the second lens element 21b is in physical contact with the first lens element 21a. The outer surface 232b at a section of the light-absorbing coating layer 23b fixed on the image-side surface 212b of the second lens element 21b is in physical contact with the first light-blocking element LB21 and the third lens element 21c.

When a length of the outer surface 232b of the light-absorbing coating layer 23b that is in physical contact with the lateral wall portion 223 of the lens barrel 22 along a direction substantially in parallel with the optical axis 204 is LA, and a length of the inner surface 231b of a section of the light-absorbing coating layer 23b fixed on the outer annular surface 213b of the second lens element 21b along a direction substantially in parallel with the optical axis 204 is LT, the following conditions are satisfied: LA=0.35 [mm]; LT=0.43 [mm]; and LA/LT=0.81.

When a minimum thickness of a section of the light-absorbing coating layer 23b fixed on the outer annular surface 213b of the second lens element 21b is dA1, a maximum thickness of the section of the light-absorbing coating layer 23b fixed on the outer annular surface 213b of the second lens element 21b is dA2, a difference between the maximum thickness dA2 and the minimum thickness dA1 is ΔdA, and a thickness of a section of the light-absorbing coating layer 23b fixed on the object-side surface 211b or the image-side surface 212b of the second lens element 21b is dC, the following conditions are satisfied: dA1=0.021 [mm]; dA2=0.022 [mm]; ΔdA=0.001 [mm]=1 [um]; dC=0.02 or 0.01 [mm]; dA1/dC=1.05 or 2.1; ΔdA<dA1; ΔdA/dA1=0.05; and ΔdA/dC=0.05 or 0.10.

The light-absorbing coating layer 23c is fixed on the outer annular surface 213c of the third lens element 21c and is in physical contact with the lens barrel 22. The light-absorbing coating layer 23c has an inner surface 231c and an outer surface 232c. The inner surface 231c faces and is fixed on the outer annular surface 213c of the third lens element 21c. The outer surface 232c is opposite to the inner surface 231c, and the outer surface 232c is located farther away from the outer annular surface 213c of the third lens element 21c than the inner surface 231c. The outer surface 232c is in physical contact with the lateral wall portion 223 of the lens barrel 22.

When a length of the outer surface 232c of the light-absorbing coating layer 23c that is in physical contact with the lateral wall portion 223 of the lens barrel 22 along a direction substantially in parallel with the optical axis 204 is LA, and a length of the inner surface 231c of a section of the light-absorbing coating layer 23c fixed on the outer annular surface 213c of the third lens element 21c along a direction substantially in parallel with the optical axis 204 is LT, the following conditions are satisfied: LA=0.37 [mm]; LT=0.44 [mm]; and LA/LT=0.84.

When a minimum thickness of a section of the light-absorbing coating layer 23c fixed on the outer annular surface 213c of the third lens element 21c is dA1, a maximum thickness of the section of the light-absorbing coating layer 23c fixed on the outer annular surface 213c of the third lens element 21c is dA2, and a difference between the maximum thickness dA2 and the minimum thickness dA1 is ΔdA, the following conditions are satisfied: dA1=0.005 [mm]; dA2=0.006 [mm]; ΔdA=0.001 [mm]=1 [um]; ΔdA<dA1; and ΔdA/dA1=0.20.

In the description of this embodiment, the light-absorbing coating layers 23a, 23b and 23c are exemplarily respectively disposed on the first lens element 21a, the second lens element 21b and the third lens element 21c, and the present disclosure is not limited thereto. In some other embodiments, each of the light-absorbing coating layers may be disposed on any one of the other plastic lens elements.

3rd Embodiment

Figure 13:
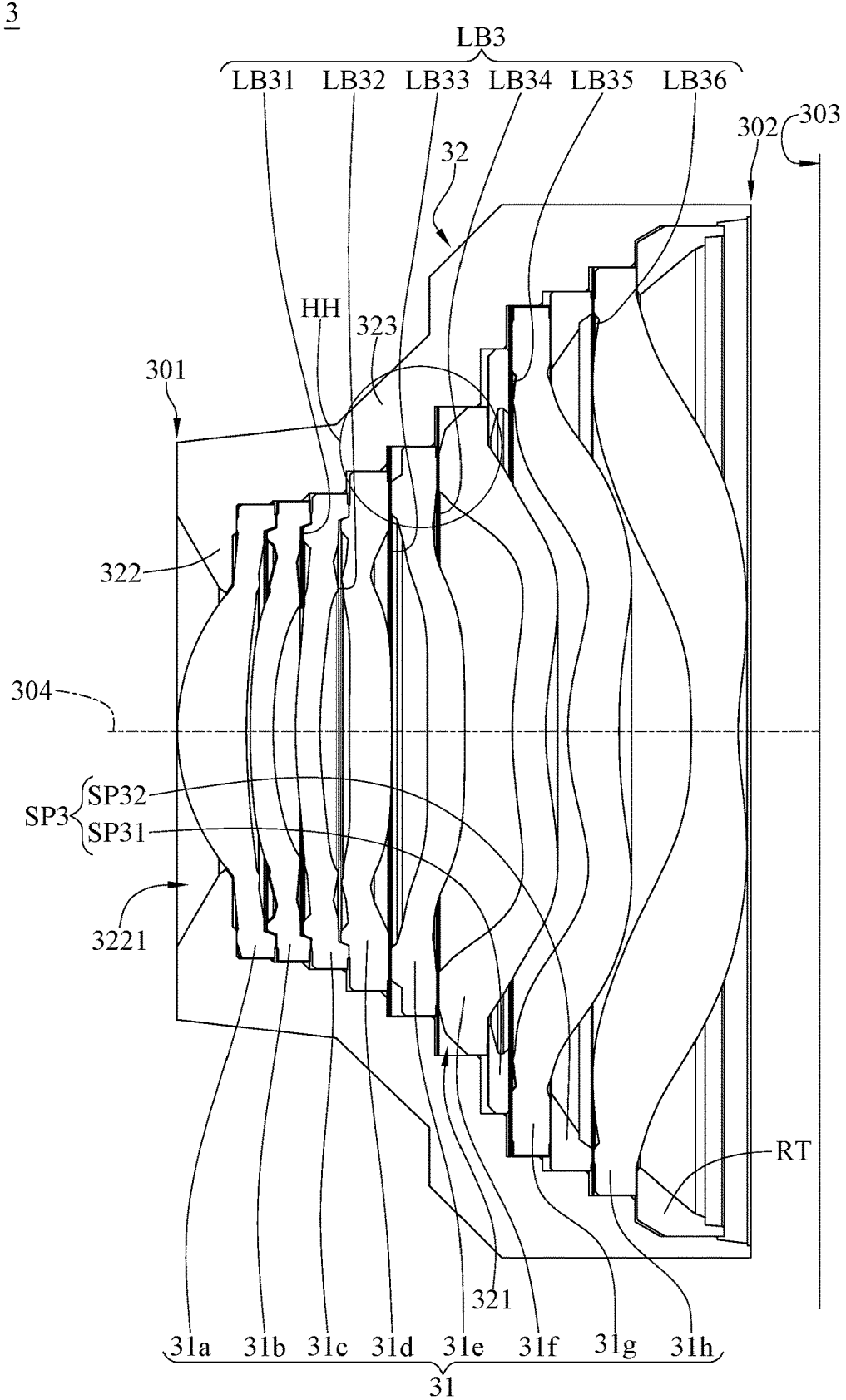
FIG. 13 is a cross-sectional view of an imaging lens system according to the 3rd embodiment of the present disclosure.
Figure 14:
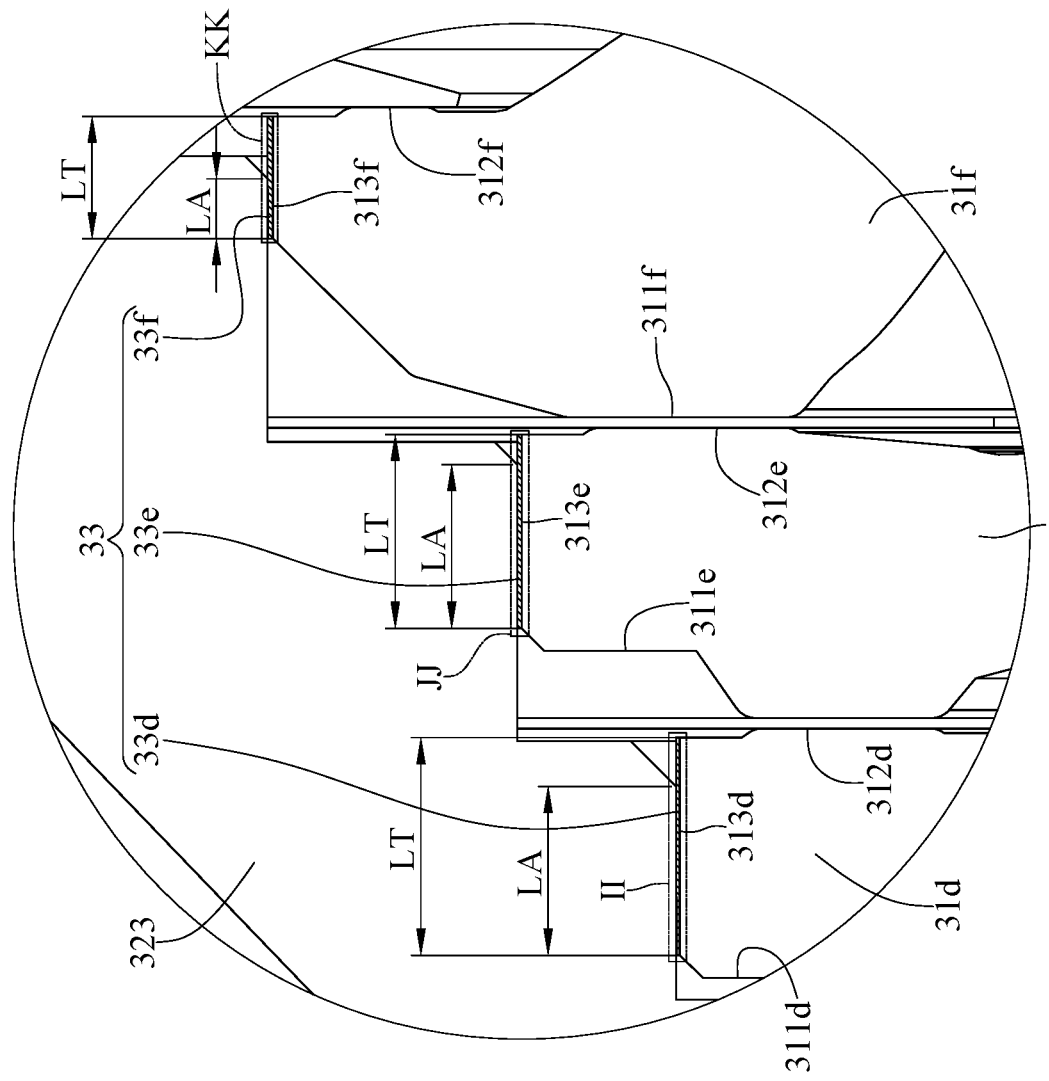
FIG. 14 is an enlarged view of the HH region of the imaging lens system in FIG. 13.
Figure 15:
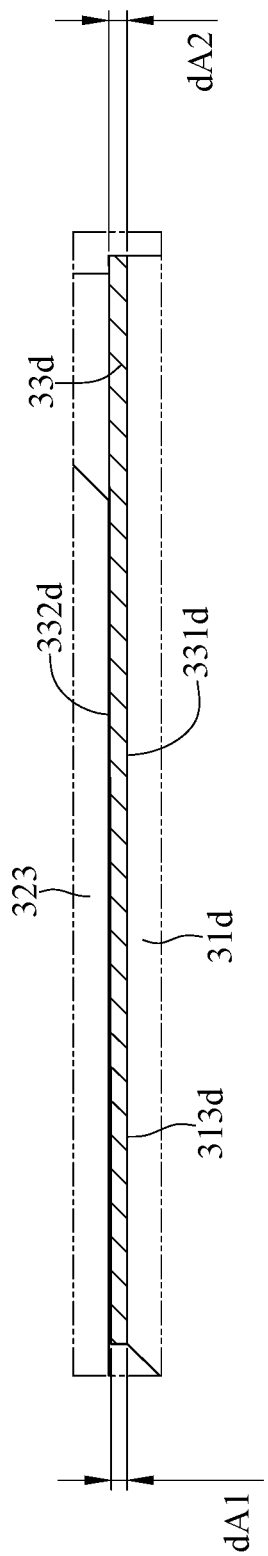
FIG. 15 is an enlarged view of the II region of the imaging lens system in FIG. 14.
Figure 16:
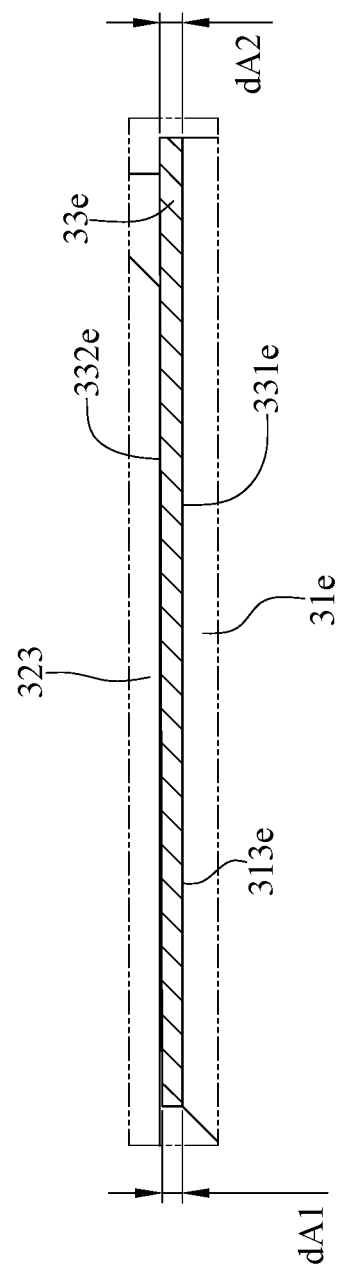
FIG. 16 is an enlarged view of the JJ region of the imaging lens system in FIG. 14.
Figure 17:
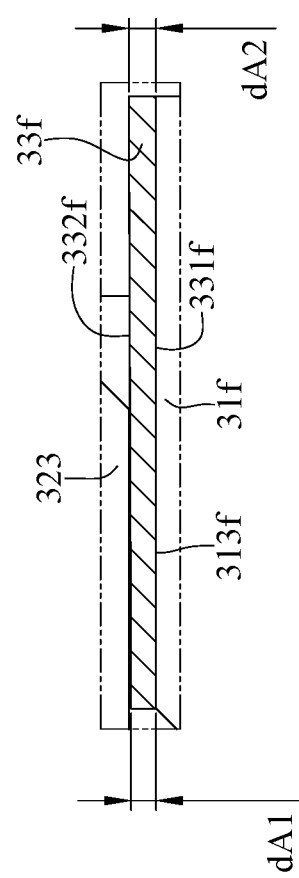
FIG. 17 is an enlarged view of the KK region of the imaging lens system in FIG. 14.

Please refer to FIG. 13 to FIG. 17, where FIG. 13 is a cross-sectional view of an imaging lens system according to the 3rd embodiment of the present disclosure, FIG. 14 is an enlarged view of the HH region of the imaging lens system in FIG. 13, FIG. 15 is an enlarged view of the II region of the imaging lens system in FIG. 14, FIG. 16 is an enlarged view of the JJ region of the imaging lens system in FIG. 14, and FIG. 17 is an enlarged view of the KK region of the imaging lens system in FIG. 14.

This embodiment provides an imaging lens system 3 that has an object side 301, an image side 302, an image surface 303 and an optical axis 304. The image side 302 is opposite to the object side 301. The image surface 303 is located close to the image side 302 and away from the object side 301, and the imaging lens system 3 images on the image surface 303. The optical axis 304 passes through the object side 301, the image side 302 and the image surface 303. The imaging lens system 3 includes a plurality of plastic lens elements 31, a plurality of light-blocking elements LB3, a plurality of spacers SP3, a retainer RT, a lens barrel 32 and a plurality of light-absorbing coating layers 33.

The plastic lens elements 31 include a first lens element 31a, a second lens element 31b, a third lens element 31c, a fourth lens element 31d, a fifth lens element 31e, a sixth lens element 31f, a seventh lens element 31g and an eighth lens element 31h. The light-blocking elements LB3 include a first light-blocking element LB31, a second light-blocking element LB32, a third light-blocking element LB33, a fourth light-blocking element LB34, a fifth light-blocking element LB35 and a sixth light-blocking element LB36. The spacers SP3 include a first spacer SP31 and a second spacer SP32. The plastic lens elements 31, the light-blocking elements LB3, the spacers SP3 and the retainer RT are arranged along a direction in parallel with the optical axis 304 in order from the object side 301 to the image side 302 as follows: the first lens element 31a, the second lens element 31b, the first light-blocking element LB31, the third lens element 31c, the second light-blocking element LB32, the fourth lens element 31d, the third light-blocking element LB33, the fifth lens element 31e, the fourth light-blocking element LB34, the sixth lens element 31f, the first spacer SP31, the fifth light-blocking element LB35, the seventh lens element 31g, the second spacer SP32, the sixth light-blocking element LB36, the eighth lens element 31h and the retainer RT.

The fourth lens element 31d has an object-side surface 311d, an image-side surface 312d and an outer annular surface 313d. The object-side surface 311d faces the object side 301 of the imaging lens system 3. The image-side surface 312d faces the image side 302 of the imaging lens system 3, and the image-side surface 312d is opposite to the object-side surface 311d. The outer annular surface 313d is connected to the object-side surface 311d and the image-side surface 312d.

The fifth lens element 31e has an object-side surface 311e, an image-side surface 312e and an outer annular surface 313e. The object-side surface 311e faces the object side 301 of the imaging lens system 3. The image-side surface 312e faces the image side 302 of the imaging lens system 3, and the image-side surface 312e is opposite to the object-side surface 311e. The outer annular surface 313e is connected to the object-side surface 311e and the image-side surface 312e.

The sixth lens element 31f has an object-side surface 311f, an image-side surface 312f and an outer annular surface 313f. The object-side surface 311f faces the object side 301 of the imaging lens system 3. The image-side surface 312f faces the image side 302 of the imaging lens system 3, and the image-side surface 312f is opposite to the object-side surface 311f. The outer annular surface 313f is connected to the object-side surface 311f and the image-side surface 312f.

The lens barrel 32 has an internal space 321 for accommodating the plastic lens elements 31, the light-blocking elements LB3, the spacers SP3 and the retainer RT. The lens barrel 32 includes a plate portion 322 and a lateral wall portion 323. The plate portion 322 is located close to the object side 301 of the imaging lens system 3. The plate portion 322 has a light-passable hole 3221, and the optical axis 304 of the imaging lens system 3 passes through the light-passable hole 3221. The lateral wall portion 323 is located close to the image side 302 of the imaging lens system 3. The lateral wall portion 323 is connected to the plate portion 322, and the lateral wall portion 323 extends from the plate portion 322 along a direction substantially parallel to the optical axis 304. The lateral wall portion 323 has a plurality of step surfaces (not numbered) at a side thereof close to the internal space 321, and the step surfaces correspond to the outer annular surface 313d of the fourth lens element 31d, the outer annular surface 313e of the fifth lens element 31e, the outer annular surface 313f of the sixth lens element 31f and outer annular surfaces (not numbered) of the other plastic lens elements 31a, 31b, 31c, 31g and 31h.

The light-absorbing coating layers 33 include a light-absorbing coating layer 33d, a light-absorbing coating layer 33e and a light-absorbing coating layer 33f.

The light-absorbing coating layer 33d is fixed on the outer annular surface 313d of the fourth lens element 31d and is in physical contact with the lens barrel 32. The light-absorbing coating layer 33d has an inner surface 331d and an outer surface 332d. The inner surface 331d faces and is fixed on the outer annular surface 313d of the fourth lens element 31d. The outer surface 332d is opposite to the inner surface 331d, and the outer surface 332d is located farther away from the outer annular surface 313d of the fourth lens element 31d than the inner surface 331d. The outer surface 332d is in physical contact with the lateral wall portion 323 of the lens barrel 32.

When a length of the outer surface 332d of the light-absorbing coating layer 33d that is in physical contact with the lateral wall portion 323 of the lens barrel 32 along a direction substantially in parallel with the optical axis 304 is LA, and a length of the inner surface 331d of a section of the light-absorbing coating layer 33d fixed on the outer annular surface 313d of the fourth lens element 31d along a direction substantially in parallel with the optical axis 304 is LT, the following conditions are satisfied: LA=0.37 [mm]; LT=0.48 [mm]; and LA/LT=0.77.

When a minimum thickness of a section of the light-absorbing coating layer 33d fixed on the outer annular surface 313d of the fourth lens element 31d is dA1, a maximum thickness of the section of the light-absorbing coating layer 33d fixed on the outer annular surface 313d of the fourth lens element 31d is dA2, and a difference between the maximum thickness dA2 and the minimum thickness dA1 is ΔdA, the following conditions are satisfied: dA1=0.007 [mm]; dA2=0.008 [mm]; ΔdA=0.001 [mm]=1 [um]; ΔdA<dA1; and ΔdA/dA1=0.14.

The light-absorbing coating layer 33e is fixed on the outer annular surface 313e of the fifth lens element 31e and is in physical contact with the lens barrel 32. The light-absorbing coating layer 33e has an inner surface 331e and an outer surface 332e. The inner surface 331e faces and is fixed on the outer annular surface 313e of the fifth lens element 31e. The outer surface 332e is opposite to the inner surface 331e, and the outer surface 332e is located farther away from the outer annular surface 313e of the fifth lens element 31e than the inner surface 331e. The outer surface 332e is in physical contact with the lateral wall portion 323 of the lens barrel 32.

When a length of the outer surface 332e of the light-absorbing coating layer 33e that is in physical contact with the lateral wall portion 323 of the lens barrel 32 along a direction substantially in parallel with the optical axis 304 is LA, and a length of the inner surface 331e of a section of the light-absorbing coating layer 33e fixed on the outer annular surface 313e of the fifth lens element 31e along a direction substantially in parallel with the optical axis 304 is LT, the following conditions are satisfied: LA=0.36 [mm]; LT=0.43 [mm]; and LA/LT=0.84.

When a minimum thickness of a section of the light-absorbing coating layer 33e fixed on the outer annular surface 313e of the fifth lens element 31e is dA1, a maximum thickness of the section of the light-absorbing coating layer 33e fixed on the outer annular surface 313e of the fifth lens element 31e is dA2, and a difference between the maximum thickness dA2 and the minimum thickness dA1 is ΔdA, the following conditions are satisfied: dA1=0.009 [mm]; dA2=0.01 [mm]; ΔdA=0.001 [mm]=1 [um]; ΔdA<dA1; and ΔdA/dA1=0.11.

The light-absorbing coating layer 33f is fixed on the outer annular surface 313f of the sixth lens element 31f and is in physical contact with the lens barrel 32. The light-absorbing coating layer 33f has an inner surface 331f and an outer surface 332f. The inner surface 331f faces and is fixed on the outer annular surface 313f of the sixth lens element 31f. The outer surface 332f is opposite to the inner surface 331f, and the outer surface 332f is located farther away from the outer annular surface 313f of the sixth lens element 31f than the inner surface 331f. The outer surface 332f is in physical contact with the lateral wall portion 323 of the lens barrel 32.

When a length of the outer surface 332f of the light-absorbing coating layer 33f that is in physical contact with the lateral wall portion 323 of the lens barrel 32 along a direction substantially in parallel with the optical axis 304 is LA, and a length of the inner surface 331f of a section of the light-absorbing coating layer 33f fixed on the outer annular surface 313f of the sixth lens element 31f along a direction substantially in parallel with the optical axis 304 is LT, the following conditions are satisfied: LA=0.13 [mm]; LT=0.27 [mm]; and LA/LT=0.48.

When a minimum thickness of a section of the light-absorbing coating layer 33f fixed on the outer annular surface 313f of the sixth lens element 31f is dA1, a maximum thickness of the section of the light-absorbing coating layer 33f fixed on the outer annular surface 313f of the sixth lens element 31f is dA2, and a difference between the maximum thickness dA2 and the minimum thickness dA1 is ΔdA, the following conditions are satisfied: dA1=0.011 [mm]; dA2=0.012 [mm]; ΔdA=0.001 [mm]=1 [um]; ΔdA<dA1; and ΔdA/dA1=0.09.

In the description of this embodiment, the light-absorbing coating layers 33d, 33e and 33f are exemplarily respectively disposed on the fourth lens element 31d, the fifth lens element 31e and the sixth lens element 31f, and the present disclosure is not limited thereto. In some other embodiments, each of the light-absorbing coating layers may be disposed on any one of the other plastic lens elements.

4th Embodiment

Figure 18:
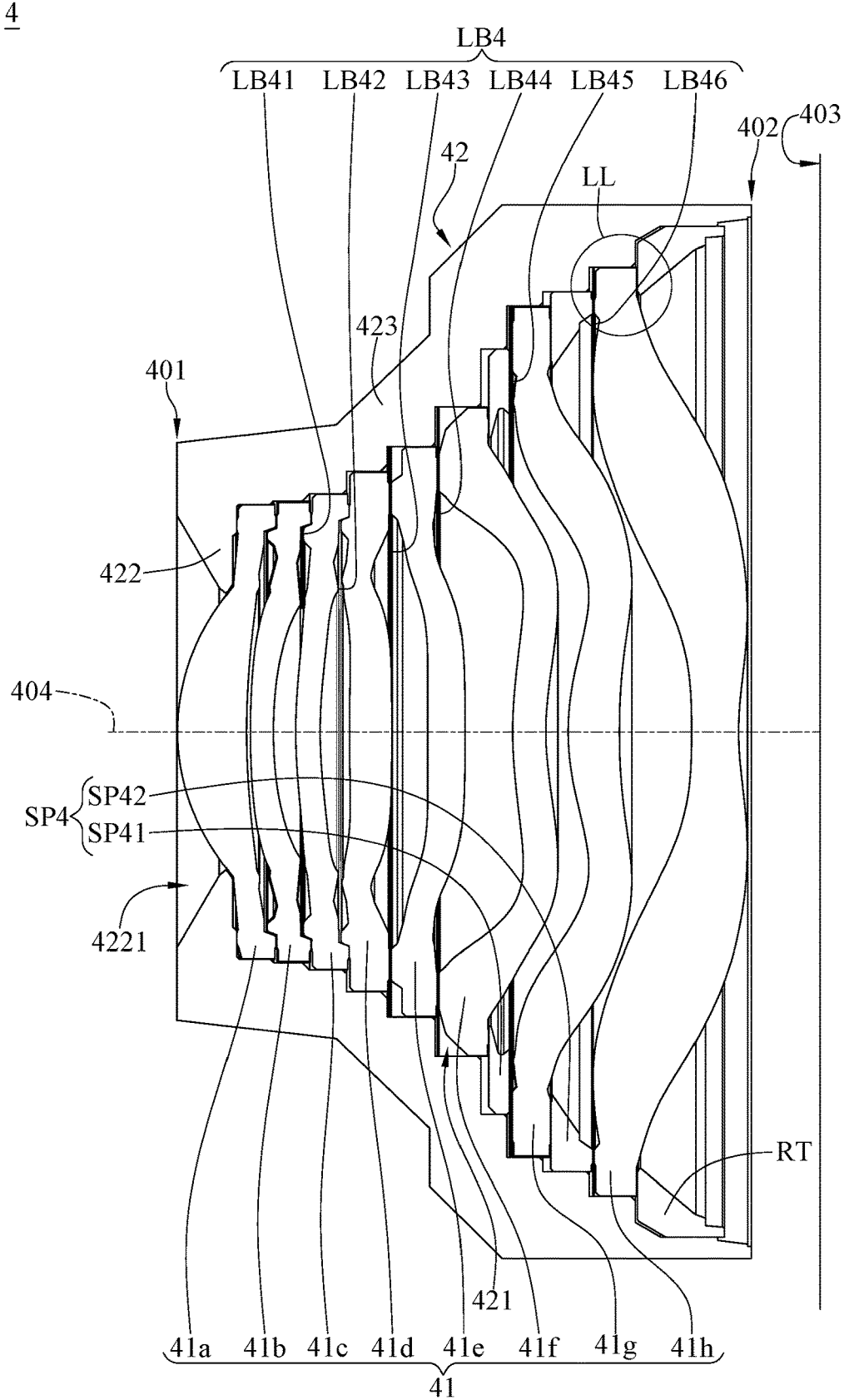
FIG. 18 is a cross-sectional view of an imaging lens system according to the 4thd embodiment of the present disclosure.
Figure 19:
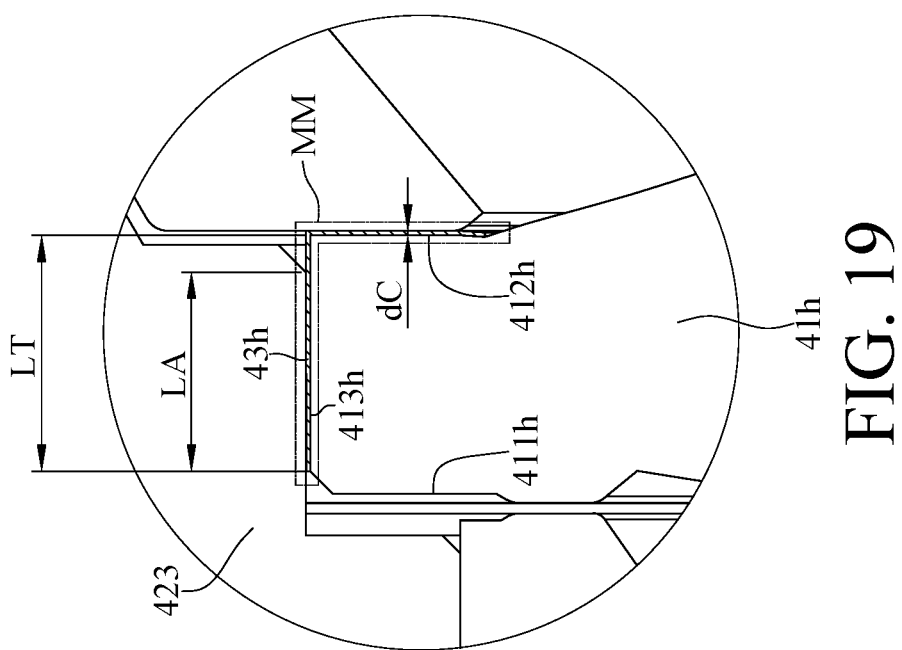
FIG. 19 is an enlarged view of the LL region of the imaging lens system in FIG. 18.
Figure 20:
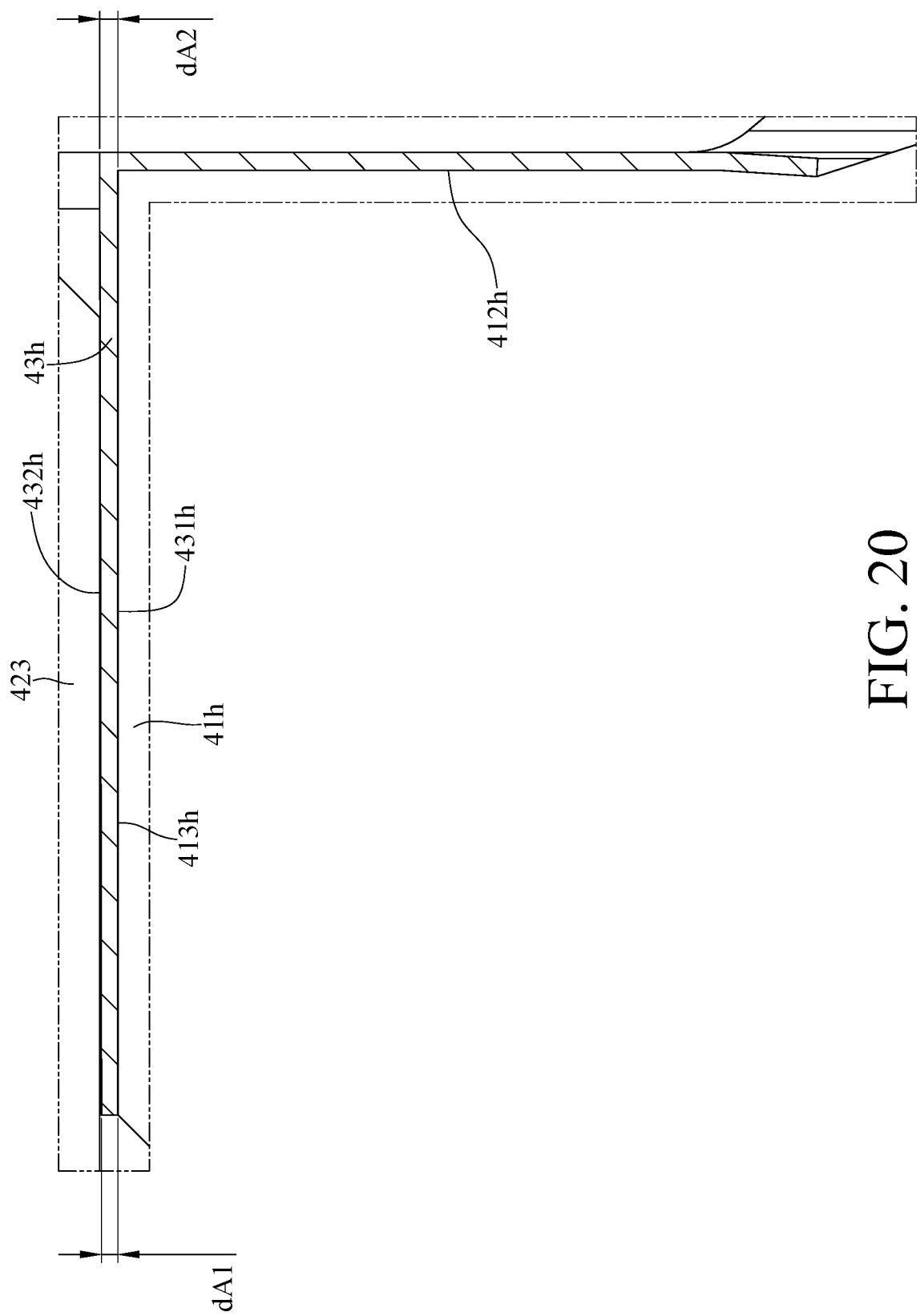
FIG. 20 is an enlarged view of the MM region of the imaging lens system in FIG. 19.

Please refer to FIG. 18 to FIG. 20, where FIG. 18 is a cross-sectional view of an imaging lens system according to the 4thd embodiment of the present disclosure, FIG. 19 is an enlarged view of the LL region of the imaging lens system in FIG. 18, and FIG. 20 is an enlarged view of the MM region of the imaging lens system in FIG. 19.

This embodiment provides an imaging lens system 4 that has an object side 401, an image side 402, an image surface 403 and an optical axis 404. The image side 402 is opposite to the object side 401. The image surface 403 is located close to the image side 402 and away from the object side 401, and the imaging lens system 4 images on the image surface 403. The optical axis 404 passes through the object side 401, the image side 402 and the image surface 403. The imaging lens system 4 includes a plurality of plastic lens elements 41, a plurality of light-blocking elements LB4, a plurality of spacers SP4, a retainer RT, a lens barrel 42 and a light-absorbing coating layer 43h.

The plastic lens elements 41 include a first lens element 41a, a second lens element 41b, a third lens element 41c, a fourth lens element 41d, a fifth lens element 41e, a sixth lens element 41f, a seventh lens element 41g and an eighth lens element 41h. The light-blocking elements LB4 include a first light-blocking element LB41, a second light-blocking element LB42, a third light-blocking element LB43, a fourth light-blocking element LB44, a fifth light-blocking element LB45 and a sixth light-blocking element LB46. The spacers SP4 include a first spacer SP41 and a second spacer SP42. The plastic lens elements 41, the light-blocking elements LB4, the spacers SP4 and the retainer RT are arranged along a direction in parallel with the optical axis 404 in order from the object side 401 to the image side 402 as follows: the first lens element 41a, the second lens element 41b, the first light-blocking element LB41, the third lens element 41c, the second light-blocking element LB42, the fourth lens element 41d, the third light-blocking element LB43, the fifth lens element 41e, the fourth light-blocking element LB44, the sixth lens element 41f, the first spacer SP41, the fifth light-blocking element LB45, the seventh lens element 41g, the second spacer SP42, the sixth light-blocking element LB46, the eighth lens element 41h and the retainer RT.

The eighth lens element 41h has an object-side surface 411h, an image-side surface 412h and an outer annular surface 413h. The object-side surface 411h faces the object side 401 of the imaging lens system 4. The image-side surface 412h faces the image side 402 of the imaging lens system 4, and the image-side surface 412h is opposite to the object-side surface 411h. The outer annular surface 413h is connected to the object-side surface 411h and the image-side surface 412h.

The lens barrel 42 has an internal space 421 for accommodating the plastic lens elements 41, the light-blocking elements LB4, the spacers SP4 and the retainer RT. The lens barrel 42 includes a plate portion 422 and a lateral wall portion 423. The plate portion 422 is located close to the object side 401 of the imaging lens system 4. The plate portion 422 has a light-passable hole 4221, and the optical axis 404 of the imaging lens system 4 passes through the light-passable hole 4221. The lateral wall portion 423 is located close to the image side 402 of the imaging lens system 4. The lateral wall portion 423 is connected to the plate portion 422, and the lateral wall portion 423 extends from the plate portion 422 along a direction substantially parallel to the optical axis 404. The lateral wall portion 423 has a plurality of step surfaces (not numbered) at a side thereof close to the internal space 421, and the step surfaces correspond to the outer annular surface 413h of the eighth lens element 41h and outer annular surfaces (not numbered) of the other plastic lens elements 41a, 41b, 41c, 41d, 41e, 41f and 41g.

The light-absorbing coating layer 43h is fixed on the outer annular surface 413h of the eighth lens element 41h and is in physical contact with the lens barrel 42. The light-absorbing coating layer 43h has an inner surface 431h and an outer surface 432h. The inner surface 431h faces and is fixed on the outer annular surface 413h of the eighth lens element 41h. The outer surface 432h is opposite to the inner surface 431h, and the outer surface 432h is located farther away from the outer annular surface 413h of the eighth lens element 41h than the inner surface 431h. The outer surface 432h is in physical contact with the lateral wall portion 423 of the lens barrel 42.

The light-absorbing coating layer 43h extends from the outer annular surface 413h to the image-side surface 412h of the eighth lens element 41h, and some amount of the inner surface 431h of the light-absorbing coating layer 43h is fixed on the image-side surface 412h. The outer surface 432h at a section of the light-absorbing coating layer 43h fixed on the image-side surface 412h of the eighth lens element 41h is in physical contact with the retainer RT.

When a length of the outer surface 432h of the light-absorbing coating layer 43h that is in physical contact with the lateral wall portion 423 of the lens barrel 42 along a direction substantially in parallel with the optical axis 404 is LA, and a length of the inner surface 431h of a section of the light-absorbing coating layer 43h fixed on the outer annular surface 413h of the eighth lens element 41h along a direction substantially in parallel with the optical axis 404 is LT, the following conditions are satisfied: LA=0.44 [mm]; LT=0.52 [mm]; and LA/LT=0.85.

When a minimum thickness of a section of the light-absorbing coating layer 43h fixed on the outer annular surface 413h of the eighth lens element 41h is dA1, a maximum thickness of the section of the light-absorbing coating layer 43h fixed on the outer annular surface 413h of the eighth lens element 41h is dA2, a difference between the maximum thickness dA2 and the minimum thickness dA1 is ΔdA, and a thickness of a section of the light-absorbing coating layer 43h fixed on the image-side surface 412h of the eighth lens element 41h is dC, the following conditions are satisfied: dA1=0.009 [mm]; dA2=0.01 [mm]; ΔdA=0.001 [mm]=1 [um]; dC=0.01 [mm]; dA1/dC=0.90; ΔdA<dA1; ΔdA/dA1=0.11; and ΔdA/dC=0.10.

In the description of this embodiment, the light-absorbing coating layer 43h is exemplarily disposed on the eighth lens element 41h, and the present disclosure is not limited thereto. In some other embodiments, the light-absorbing coating layer may be disposed on any one of the other plastic lens elements.

5th Embodiment

Figure 21:
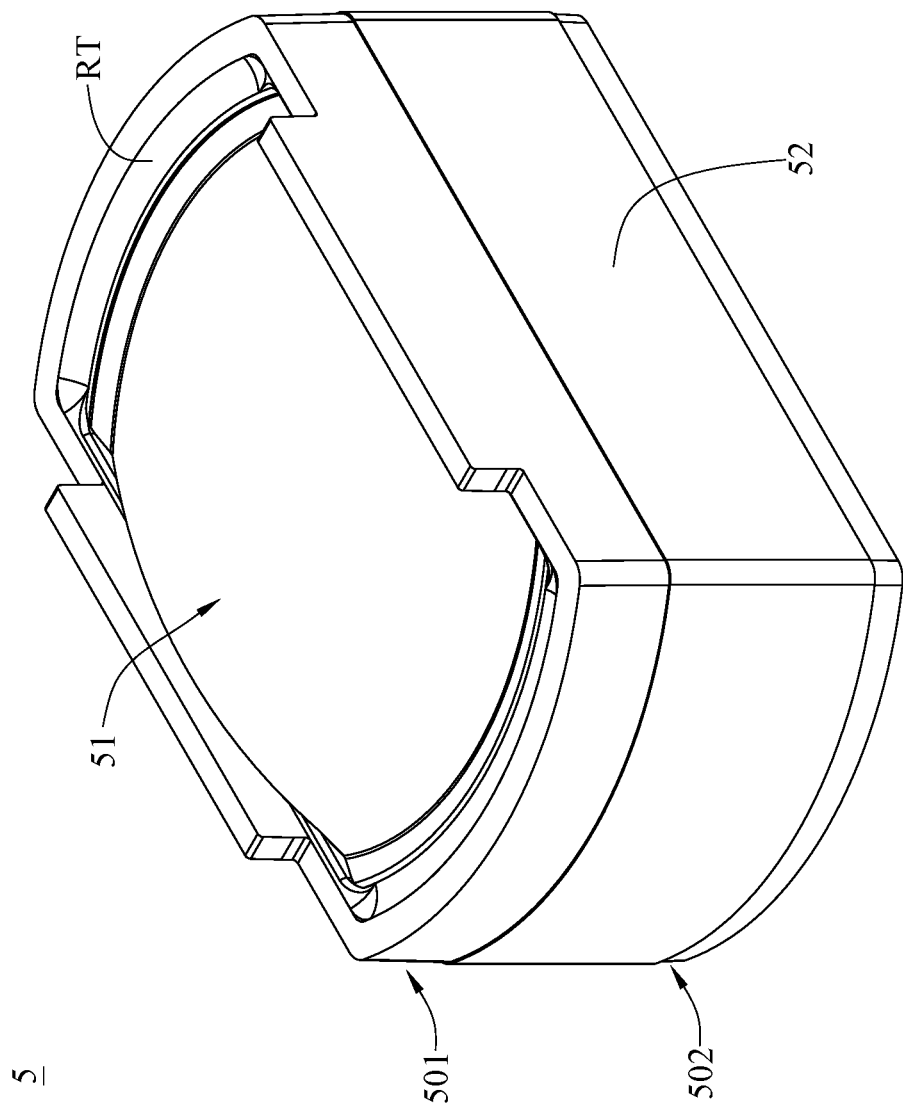
FIG. 21 is a cross-sectional view of an imaging lens system according to the 5th embodiment of the present disclosure.
Figure 22:
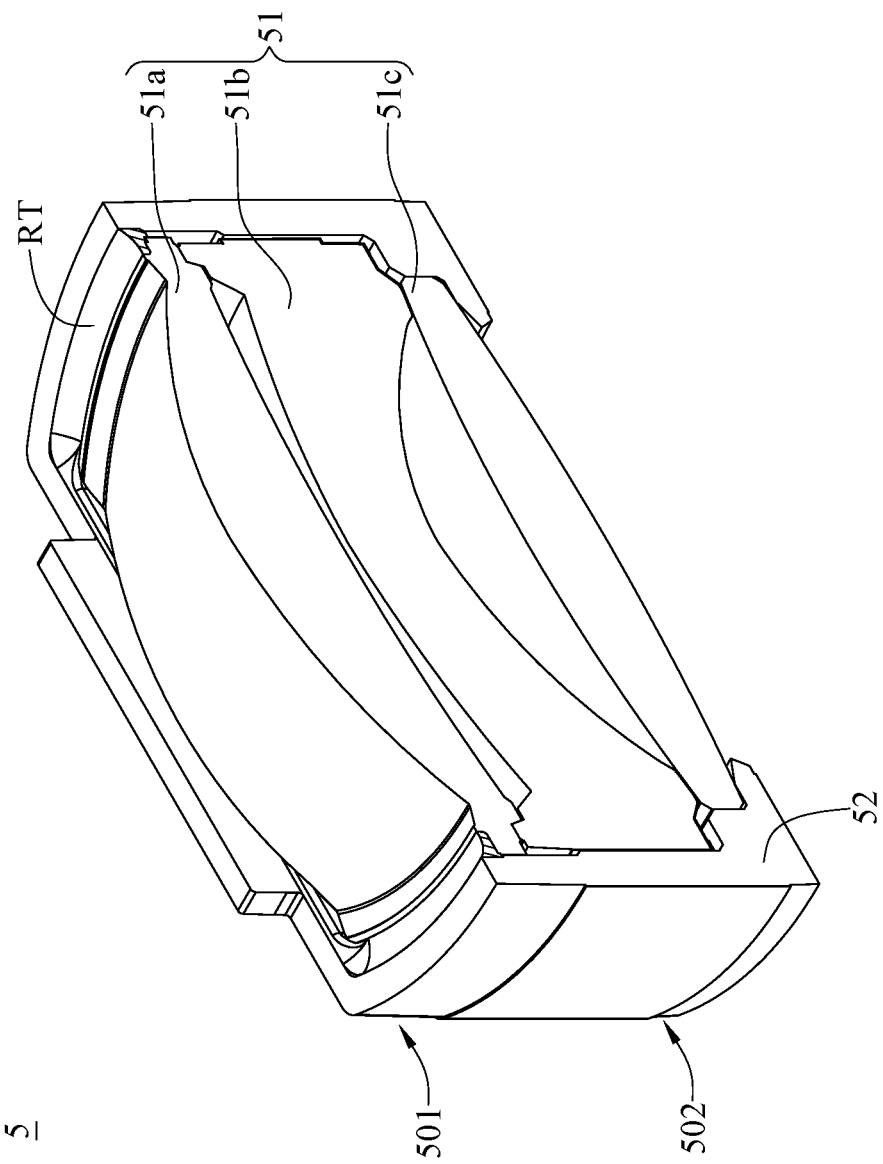
FIG. 22 is a perspective view of the imaging lens system in FIG. 21 that is partially sectioned.
Figure 23:
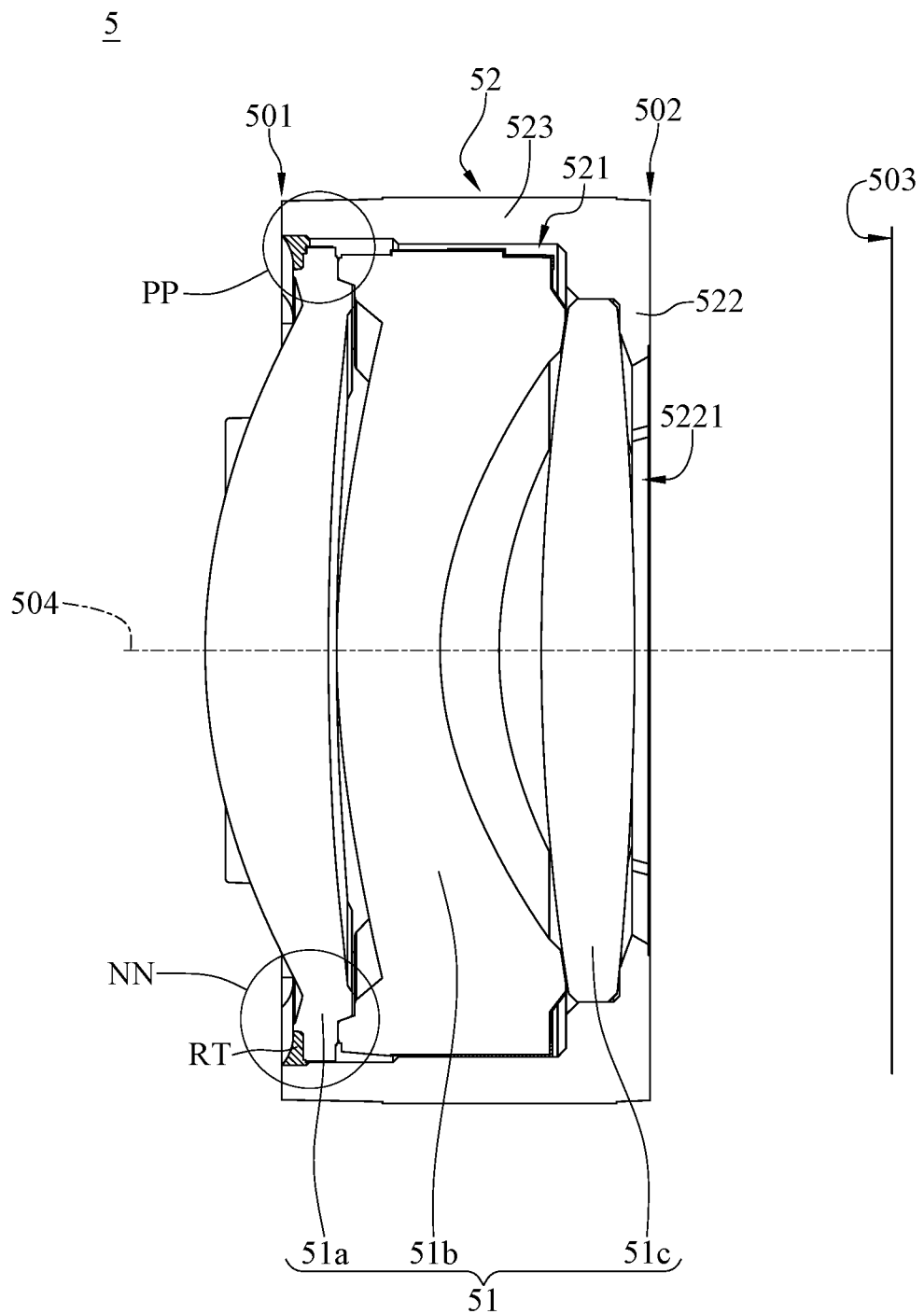
FIG. 23 is a cross-sectional view of the imaging lens system in FIG. 22.
Figure 24:
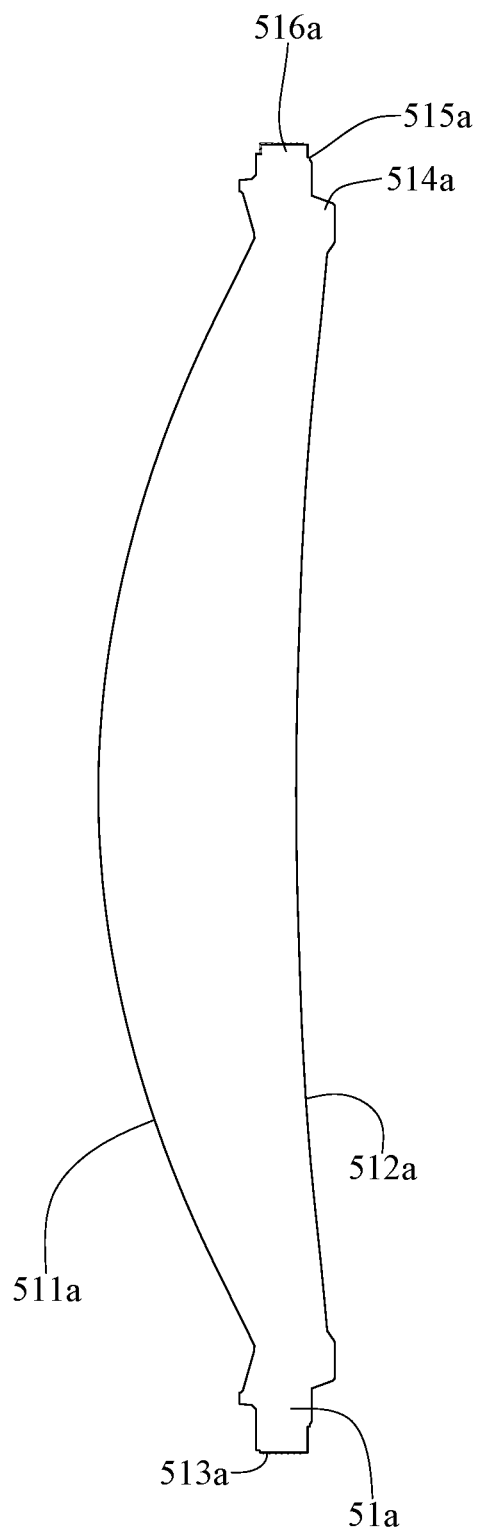
FIG. 24 is a cross-sectional view of a first lens element of the imaging lens system in FIG. 23.
Figure 25:
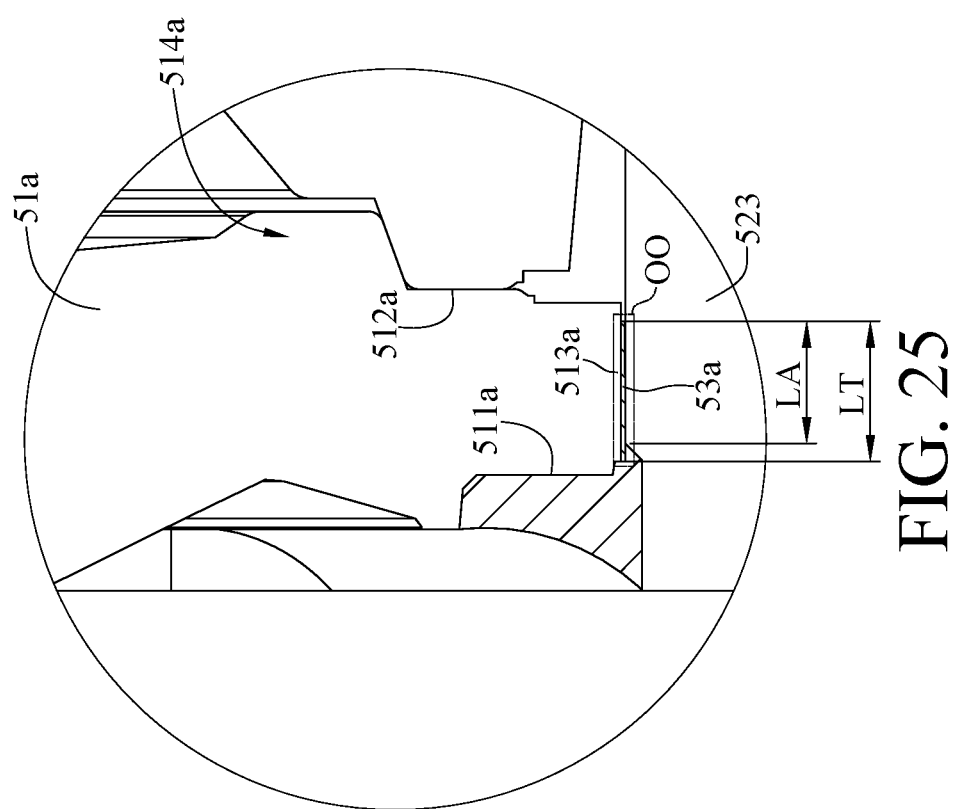
FIG. 25 is an enlarged view of the NN region of the imaging lens system in 23.
Figure 26:
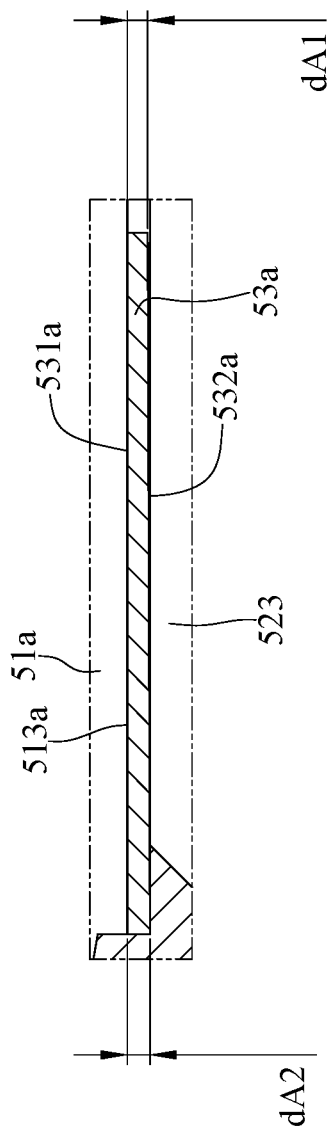
FIG. 26 is an enlarged view of the OO region of the imaging lens system in 25.
Figure 27:
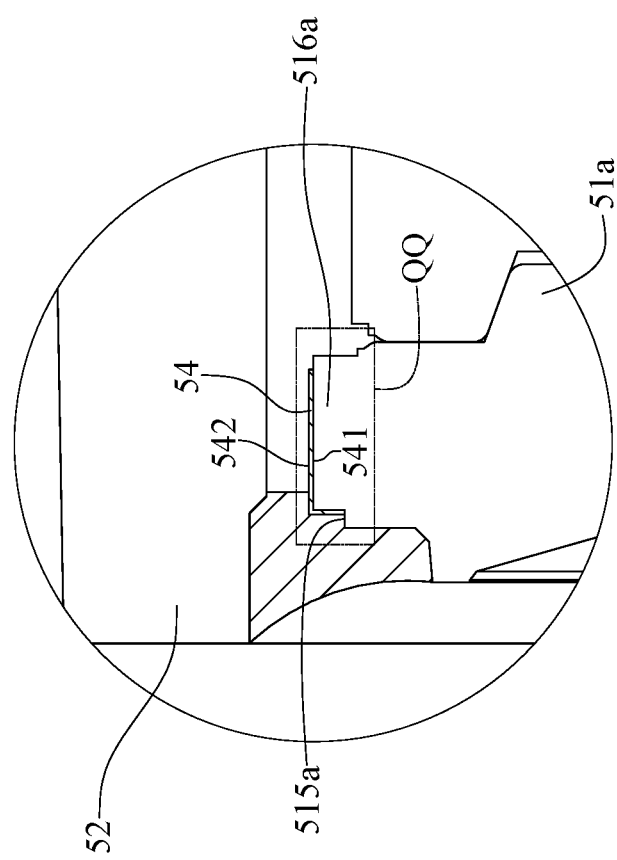
FIG. 27 is an enlarged view of the PP region of the imaging lens system in 23.
Figure 28:
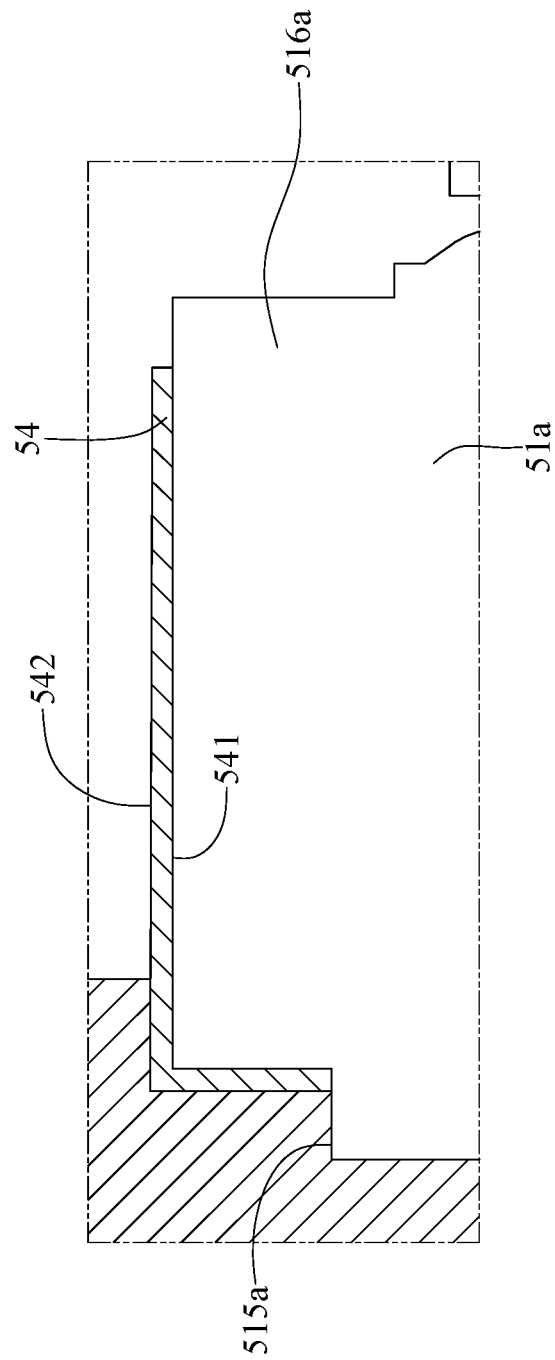
FIG. 28 is an enlarged view of the QQ region of the imaging lens system in 27.

Please refer to FIG. 21 to FIG. 28, where FIG. 21 is a cross-sectional view of an imaging lens system according to the 5th embodiment of the present disclosure, FIG. 22 is a perspective view of the imaging lens system in FIG. 21 that is partially sectioned, FIG. 23 is a cross-sectional view of the imaging lens system in FIG. 22, FIG. 24 is a cross-sectional view of a first lens element of the imaging lens system in FIG. 23, FIG. 25 is an enlarged view of the NN region of the imaging lens system in 23, FIG. 26 is an enlarged view of the OO region of the imaging lens system in 25, FIG. 27 is an enlarged view of the PP region of the imaging lens system in 23, and FIG. 28 is an enlarged view of the QQ region of the imaging lens system in 27.

This embodiment provides an imaging lens system 5 that has an object side 501, an image side 502, an image surface 503 and an optical axis 504. The image side 502 is opposite to the object side 501. The image surface 503 is located close to the image side 502 and away from the object side 501, and the imaging lens system 5 images on the image surface 503. The optical axis 504 passes through the object side 501, the image side 502 and the image surface 503. The imaging lens system 5 includes a retainer RT, a plurality of plastic lens elements 51, a lens barrel 52 and a light-absorbing coating layer 53a.

The plastic lens elements 51 include a first lens element 51a, a second lens element 51b and a third lens element 51c. The retainer RT and the plastic lens elements 51 are arranged along a direction in parallel with the optical axis 504 in order from the object side 501 to the image side 502 as follows: the retainer RT, the first lens element 51a, the second lens element 51b and the third lens element 51c.

The first lens element 51a has an object-side surface 511a, an image-side surface 512a and an outer annular surface 513a. The object-side surface 511a faces the object side 501 of the imaging lens system 5. The image-side surface 512a faces the image side 502 of the imaging lens system 5, and the image-side surface 512a is opposite to the object-side surface 511a. The outer annular surface 513a is connected to the object-side surface 511a and the image-side surface 512a.

The first lens element 51a includes an axial connection structure 514a located on the image-side surface 512a. The axial connection structure 514a is connected to the second lens element 51b. The axial connection structure 514a is engaged with the second lens element 51b, such that the first lens element 51a and the second lens element 51b are aligned with the optical axis 504.

The first lens element 51a has a trimmed surface 515a located at a side thereof close to the outer annular surface 513a. The trimmed surface 515a is connected to the outer annular surface 513a. A distance between the trimmed surface 515a and the optical axis 504 is smaller than a distance between the outer annular surface 513a and the optical axis 504. The first lens element 51a further includes a gate trace 516a on the trimmed surface 515a.

The lens barrel 52 has an internal space 521 for accommodating the plastic lens elements 51 and the retainer RT. The lens barrel 52 includes a plate portion 522 and a lateral wall portion 523. The plate portion 522 is located close to the object side 501 of the imaging lens system 5. The plate portion 522 has a light-passable hole 5221, and the optical axis 504 of the imaging lens system 5 passes through the light-passable hole 5221. The lateral wall portion 523 is located close to the image side 502 of the imaging lens system 5. The lateral wall portion 523 is connected to the plate portion 522, and the lateral wall portion 523 extends from the plate portion 522 along a direction substantially parallel to the optical axis 504. The lateral wall portion 523 has a plurality of step surfaces (not numbered) at a side thereof close to the internal space 521, and the step surfaces correspond to the outer annular surface 513a of the first lens element 51a and outer annular surfaces (not numbered) of the other plastic lens elements 51b and 51c.

The light-absorbing coating layer 53a is fixed on the outer annular surface 513a of the first lens element 51a and is in physical contact with the lens barrel 52. The light-absorbing coating layer 53a has an inner surface 531a and an outer surface 532a. The inner surface 531a faces and is fixed on the outer annular surface 513a of the first lens element 51a. The outer surface 532a is opposite to the inner surface 531a, and the outer surface 532a is located farther away from the outer annular surface 513a of the first lens element 51a than the inner surface 531a. The outer surface 532a is in physical contact with the lateral wall portion 523 of the lens barrel 52.

When a length of the outer surface 532a of the light-absorbing coating layer 53a that is in physical contact with the lateral wall portion 523 of the lens barrel 52 along a direction substantially in parallel with the optical axis 504 is LA, and a length of the inner surface 531a of a section of the light-absorbing coating layer 53a fixed on the outer annular surface 513a of the first lens element 51a along a direction substantially in parallel with the optical axis 504 is LT, the following conditions are satisfied: LA=0.27 [mm]; LT=0.31 [mm]; and LA/LT=0.87.

When a minimum thickness of a section of the light-absorbing coating layer 53a fixed on the outer annular surface 513a of the first lens element 51a is dA1, a maximum thickness of the section of the light-absorbing coating layer 53a fixed on the outer annular surface 513a of the first lens element 51a is dA2, and a difference between the maximum thickness dA2 and the minimum thickness dA1 is ΔdA, the following conditions are satisfied: dA1=0.009 [mm]; dA2=0.01 [mm]; ΔdA=0.001 [mm]=1 [urn]; ΔdA<dA1; and ΔdA/dA1=0.11.

The imaging lens system 5 further includes an auxiliary light-absorbing coating layer 54. The auxiliary light-absorbing coating layer 54 has an inner surface 541 and an outer surface 542. The inner surface 541 of the auxiliary light-absorbing coating layer 54 is fixed on the gate trace 516a, and the outer surface 542 of the auxiliary light-absorbing coating layer 54 is spaced apart from the lens barrel 52. As such, the auxiliary light-absorbing coating layer 54 and the light-absorbing coating layer 53a can be connected to each other and thus can be manufactured together in the same process.

In the description of this embodiment, the light-absorbing coating layer 53a is exemplarily disposed on the first lens element 51a, and the present disclosure is not limited thereto. In some other embodiments, the light-absorbing coating layer may be disposed on any one of the other plastic lens elements. Also, in the description of this embodiment, the trimmed surface 515a and the gate trace 516a of the first lens element 51a are only exemplary, and the present disclosure is not limited thereto. In some other embodiments, any one of the other plastic lens elements may have a trimmed surface and a gate trace.

6th Embodiment

Figure 29:
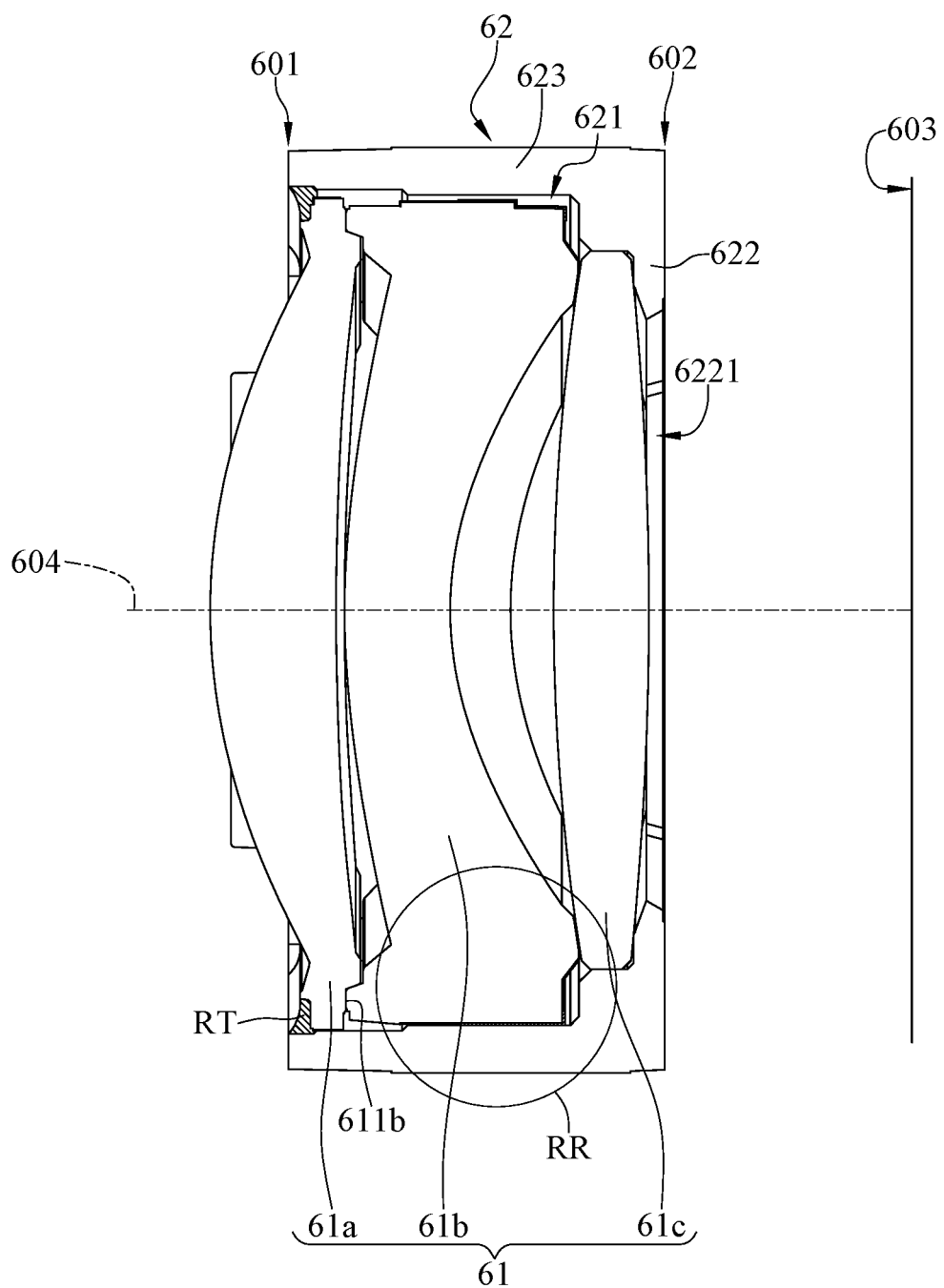
FIG. 29 is a cross-sectional view of an imaging lens system according to the 6th embodiment of the present disclosure.
Figure 30:
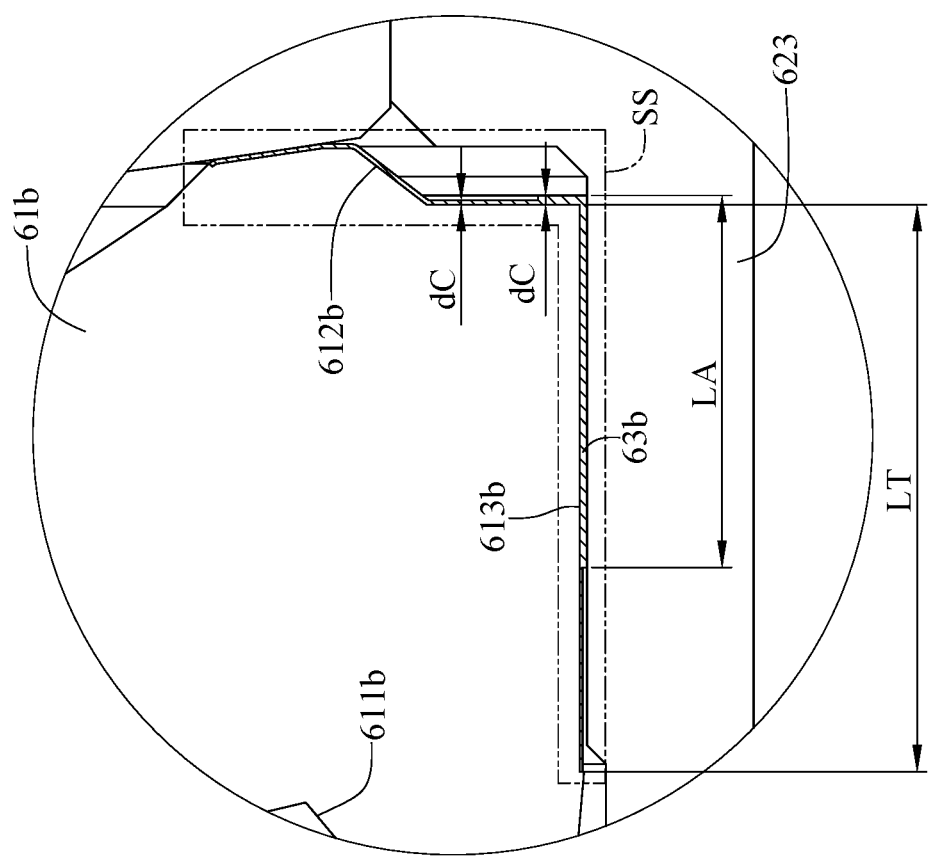
FIG. 30 is an enlarged view of the RR region of the imaging lens system in FIG. 29.
Figure 31:
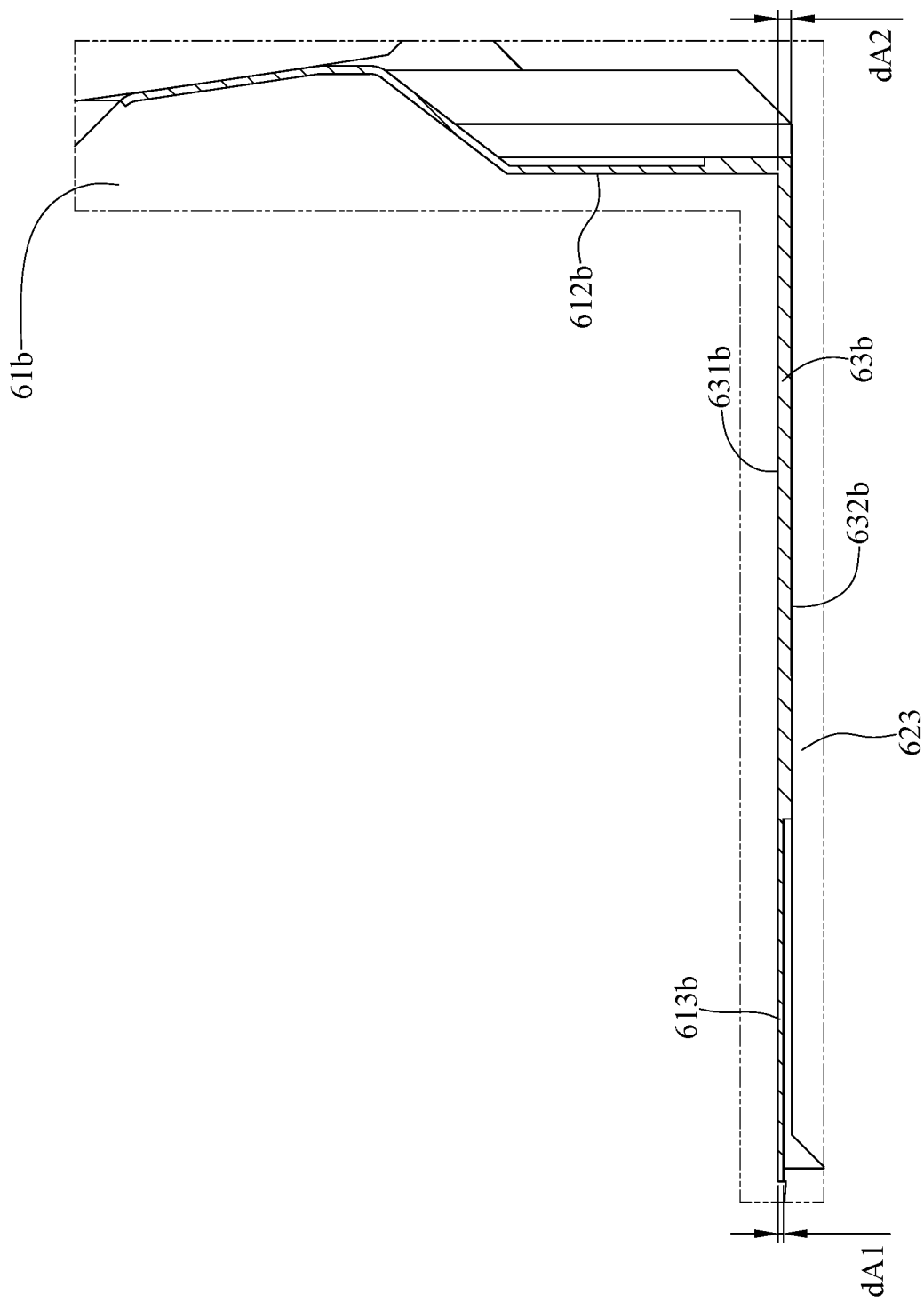
FIG. 31 is an enlarged view of the SS region of the imaging lens system in FIG. 30.

Please refer to FIG. 29 to FIG. 31, where FIG. 29 is a cross-sectional view of an imaging lens system according to the 6th embodiment of the present disclosure, FIG. 30 is an enlarged view of the RR region of the imaging lens system in FIG. 29, and FIG. 31 is an enlarged view of the SS region of the imaging lens system in FIG. 30.

This embodiment provides an imaging lens system 6 that has an object side 601, an image side 602, an image surface 603 and an optical axis 604. The image side 602 is opposite to the object side 601. The image surface 603 is located close to the image side 602 and away from the object side 601, and the imaging lens system 6 images on the image surface 603. The optical axis 604 passes through the object side 601, the image side 602 and the image surface 603. The imaging lens system 6 includes a retainer RT, a plurality of plastic lens elements 61, a lens barrel 62 and a light-absorbing coating layer 63b.

The plastic lens elements 61 include a first lens element 61a, a second lens element 61b and a third lens element 61c. The retainer RT and the plastic lens elements 61 are arranged along a direction in parallel with the optical axis 604 in order from the object side 601 to the image side 602 as follows: the retainer RT, the first lens element 61a, the second lens element 61b and the third lens element 61c.

The second lens element 61b has an object-side surface 611b, an image-side surface 612b and an outer annular surface 613b. The object-side surface 611b faces the object side 601 of the imaging lens system 6. The image-side surface 612b faces the image side 602 of the imaging lens system 6, and the image-side surface 612b is opposite to the object-side surface 611b. The outer annular surface 613b is connected to the object-side surface 611b and the image-side surface 612b.

The lens barrel 62 has an internal space 621 for accommodating the plastic lens elements 61 and the retainer RT. The lens barrel 62 includes a plate portion 622 and a lateral wall portion 623. The plate portion 622 is located close to the object side 601 of the imaging lens system 6. The plate portion 622 has a light-passable hole 6221, and the optical axis 604 of the imaging lens system 6 passes through the light-passable hole 6221. The lateral wall portion 623 is located close to the image side 602 of the imaging lens system 6. The lateral wall portion 623 is connected to the plate portion 622, and the lateral wall portion 623 extends from the plate portion 622 along a direction substantially parallel to the optical axis 604. The lateral wall portion 623 has a plurality of step surfaces (not numbered) at a side thereof close to the internal space 621, and the step surfaces correspond to the outer annular surface 613b of the second lens element 61b and outer annular surfaces (not numbered) of the other plastic lens elements 61a and 61c.

The light-absorbing coating layer 63b is fixed on the outer annular surface 613b of the second lens element 61b and is in physical contact with the lens barrel 62. The light-absorbing coating layer 63b has an inner surface 631b and an outer surface 632b. The inner surface 631b faces and is fixed on the outer annular surface 613b of the second lens element 61b. The outer surface 632b is opposite to the inner surface 631b, and the outer surface 632b is located farther away from the outer annular surface 613b of the second lens element 61b than the inner surface 631b. The outer surface 632b is in physical contact with the lateral wall portion 623 of the lens barrel 62.

The light-absorbing coating layer 63b extends from the outer annular surface 613b to the image-side surface 612b of the second lens element 61b, and some amount of the inner surface 631b of the light-absorbing coating layer 63b is fixed on the image-side surface 612b. The outer surface 632b at a section of the light-absorbing coating layer 63b fixed on the image-side surface 612b of the second lens element 61b is in physical contact with the third lens element 61c.

When a length of the outer surface 632b of the light-absorbing coating layer 63b that is in physical contact with the lateral wall portion 623 of the lens barrel 62 along a direction substantially in parallel with the optical axis 604 is LA, and a length of the inner surface 631b of a section of the light-absorbing coating layer 63b fixed on the outer annular surface 613b of the second lens element 61b along a direction substantially in parallel with the optical axis 604 is LT, the following conditions are satisfied: LA=1.23 [mm]; LT=1.87 [mm]; and LA/LT=0.66.

When a minimum thickness of a section of the light-absorbing coating layer 63b fixed on the outer annular surface 613b of the second lens element 61b is dA1, a maximum thickness of the section of the light-absorbing coating layer 63b fixed on the outer annular surface 613b of the second lens element 61b is dA2, a difference between the maximum thickness dA2 and the minimum thickness dA1 is ΔdA, and a thickness of a section of the light-absorbing coating layer 63b fixed on the image-side surface 612b of the second lens element 61b is dC, the following conditions are satisfied: dA1=0.01 [mm]; dA2=0.024 [mm]; ΔdA=0.014 [mm]=14 [um]; dC=0.03 or 0.02 [mm]; dA1/dC=0.33 or 0.50; ΔdA<dA1; ΔdA/dA1=1.4; and ΔdA/dC=0.47 or 0.70.

In the description of this embodiment, the light-absorbing coating layer 63b is exemplarily disposed on the second lens element 61b and the present disclosure is not limited thereto. In some other embodiments, the light-absorbing coating layer may be disposed on any one of the other plastic lens elements.

7th Embodiment

Figure 32:
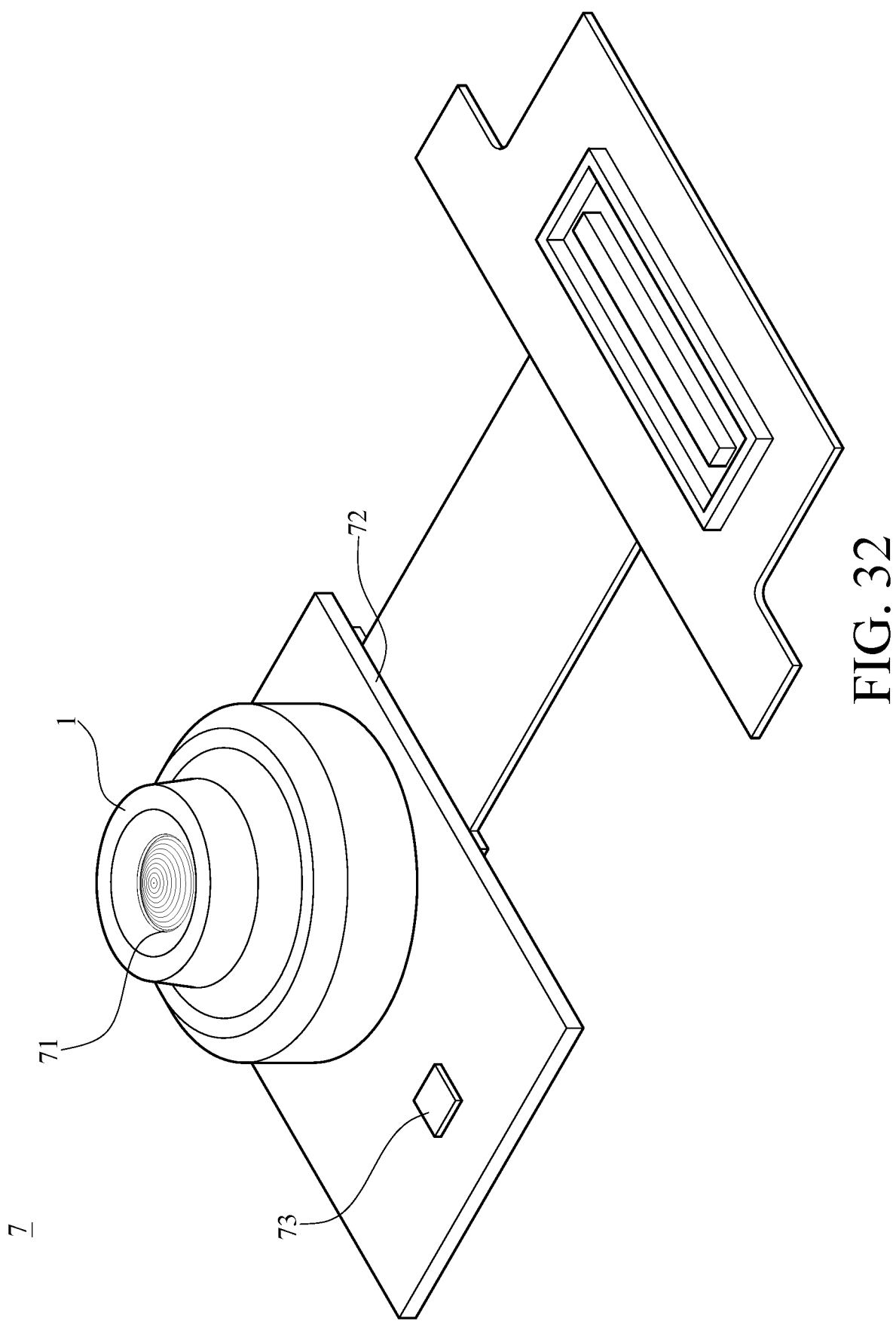
FIG. 32 is a perspective view of a camera module according to the 7th embodiment of the present disclosure.

FIG. 32 is a perspective view of a camera module according to the 7th embodiment of the present disclosure. In this embodiment, a camera module 7 includes the imaging lens system 1 disclosed in the 1st embodiment, a driving device 71, an image sensor 72 and an image stabilizer 73. The imaging lens system 1 includes the plastic lens elements 11, the light-blocking elements LB1, the spacers SP1, the retainer RT, the lens barrel 12 and the light-absorbing coating layer 13g that are disclosed in the 1st embodiment, and also includes a holder member (not shown) for holding the plastic lens elements. However, the camera module 7 may alternatively be provided with any one of the imaging lens systems 2-6 disclosed in other abovementioned embodiments, and the present disclosure is not limited thereto. The imaging light converges in the imaging lens system 1 of the camera module 7 to generate an image with the driving device 71 utilized for image focusing on the image sensor 72, and the generated image is then digitally transmitted to other electronic component for further processing.

The driving device 71 can have auto focusing functionality, and different driving configurations can be obtained through the usages of voice coil motors (VCM), micro electro-mechanical systems (MEMS), piezoelectric systems, or shape memory alloy materials. The driving device 71 is favorable for obtaining a better imaging position of the imaging lens system 1, so that a clear image of the imaged object can be captured by the imaging lens system 1 with different object distances. The image sensor 72 (for example, CCD or CMOS), which can feature high photosensitivity and low noise, is disposed on the image surface of the imaging lens system 1 to provide higher image quality.

The image stabilizer 73, such as an accelerometer, a gyro sensor and a Hall Effect sensor, is configured to work with the driving device 71 to provide optical image stabilization (OIS). The driving device 71 working with the image stabilizer 73 is favorable for compensating for pan and tilt of the imaging lens system 1 to reduce blurring associated with motion during exposure. In some cases, the compensation can be provided by electronic image stabilization (EIS) with image processing software, thereby improving image quality while in motion or low-light conditions.

8th Embodiment

Figure 33:
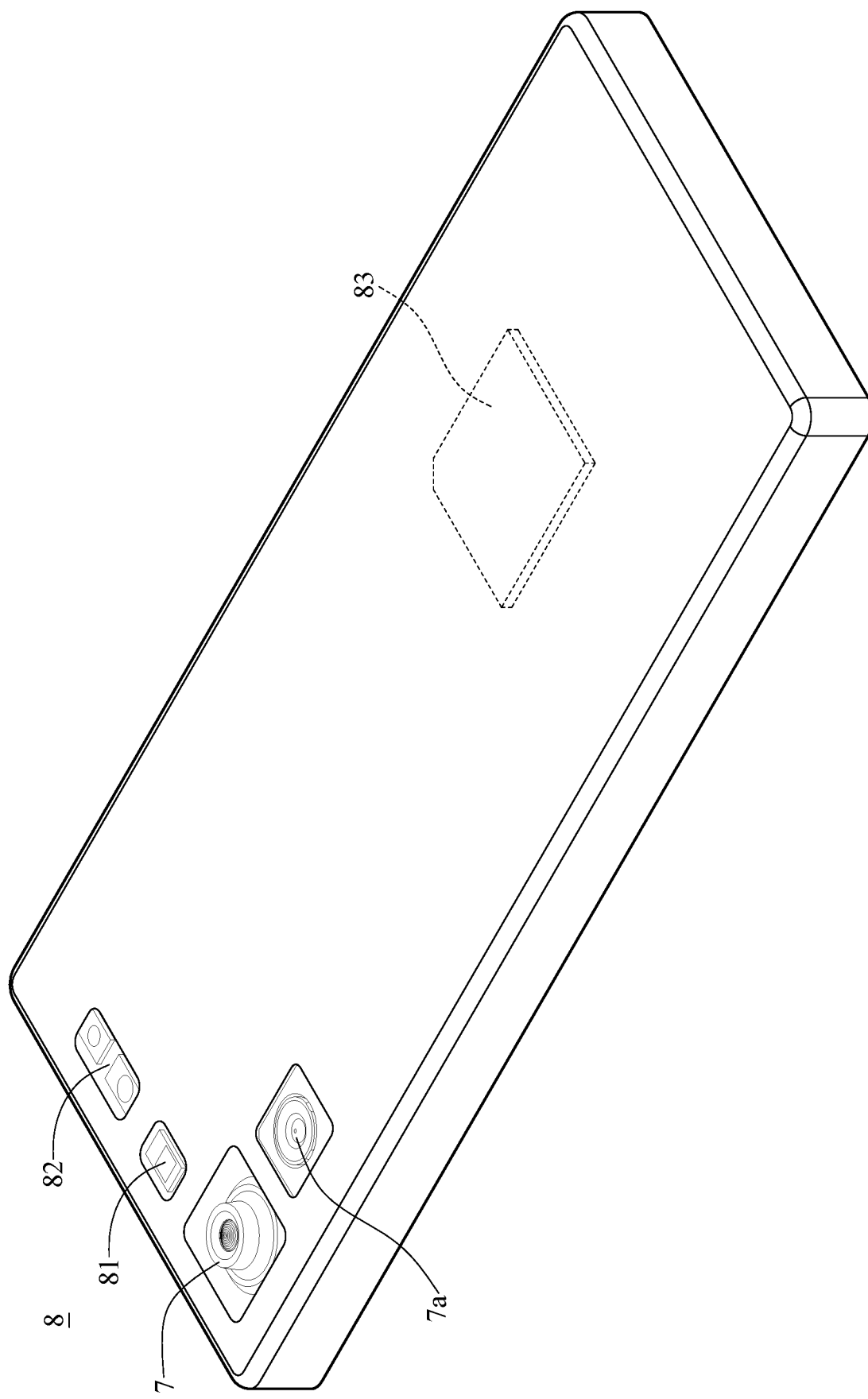
FIG. 33 is a perspective view of an electronic device according to the 8th embodiment of the present disclosure.
Figure 34:
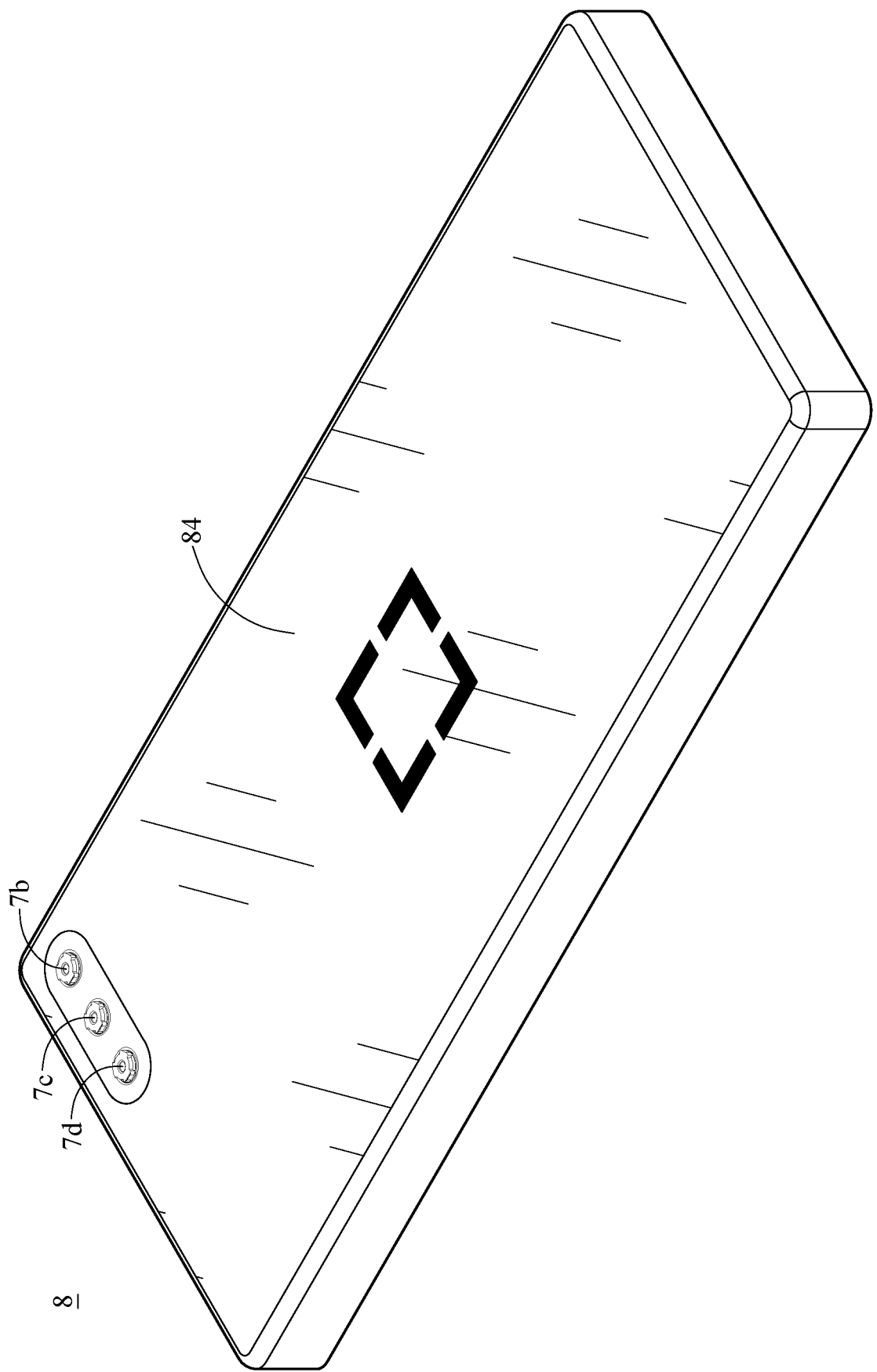
FIG. 34 is another perspective view of the electronic device in FIG. 33.
Figure 35:
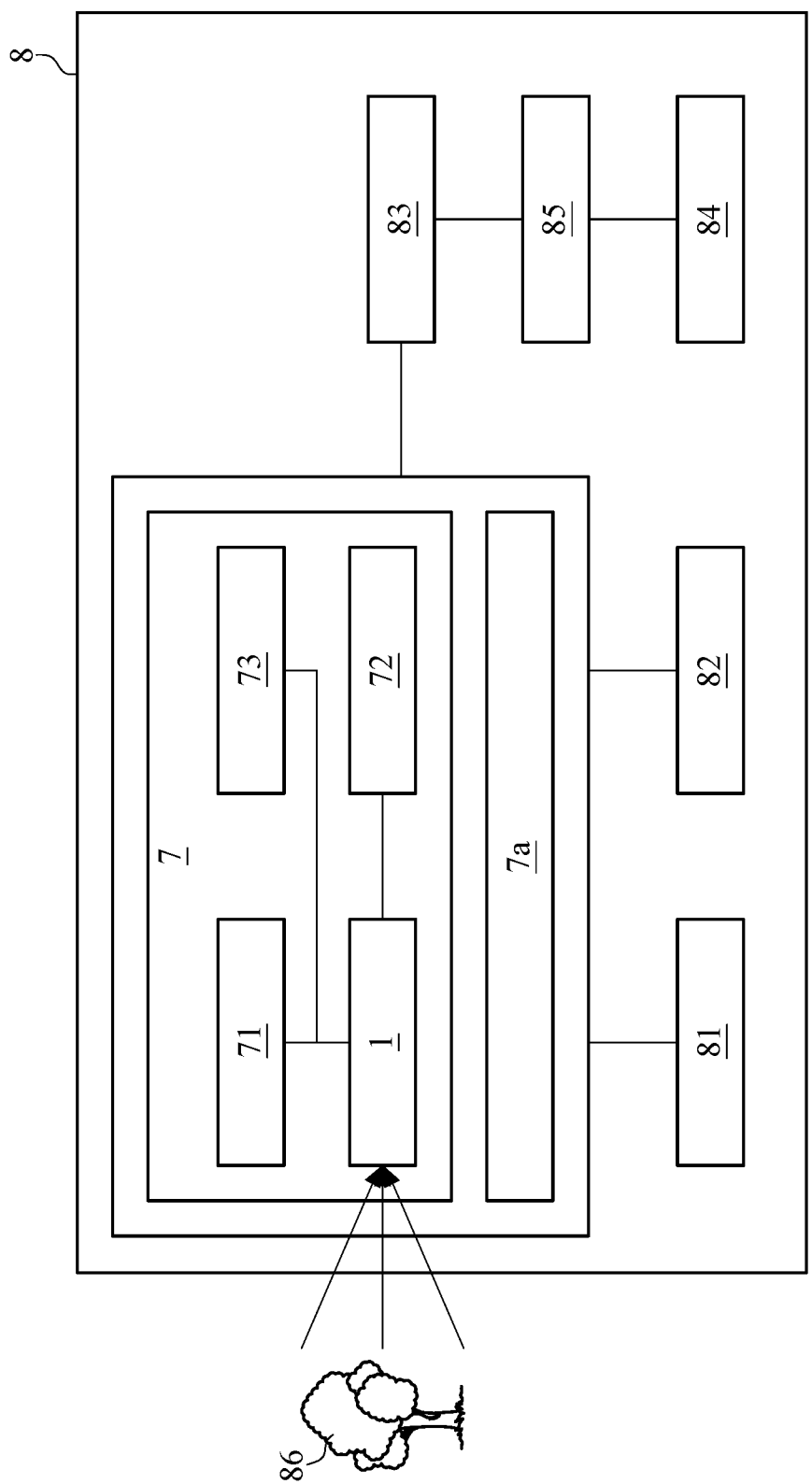
FIG. 35 is a block diagram of the electronic device in FIG. 33.

FIG. 33 is a perspective view of an electronic device according to the 8th embodiment of the present disclosure. FIG. 34 is another perspective view of the electronic device in FIG. 33. FIG. 35 is a block diagram of the electronic device in FIG. 33.

In this embodiment, an electronic device 8 is a smartphone including the camera module 7 disclosed in the 7th embodiment, a camera module 7a, a camera module 7b, a camera module 7c, a camera module 7d, a flash module 81, a focus assist module 82, an image signal processor 83, a user interface 84 and an image software processor 85. The camera module 7 and the camera module 7a are disposed on the same side of the electronic device 8 and each of the camera modules 7 and 7a has a single focal point. The camera module 7b, the camera module 7c, the camera module 7d and the user interface 84 are disposed on the opposite side of the electronic device 8 and the user interface 84 is a display unit, such that the camera modules 7b, 7c, 7d can be front-facing cameras of the electronic device 8 for taking selfies, but the present disclosure is not limited thereto. Furthermore, each of the camera modules 7a, 7b, 7c and 7d can include any one of the imaging lens systems 1-6 of the present disclosure and can have a configuration similar to that of the camera module 7. In detail, each of the camera modules 7a, 7b, 7c and 7d can include an imaging lens system, a driving device, an image sensor and an image stabilizer, and each of the imaging lens system can include a plastic lens element, a light-blocking element, a spacer, a retainer, a lens barrel and a light-absorbing coating layer that are disclosed in the abovementioned embodiments, and a holder member for holding the plastic lens element.

The camera module 7 is a wide-angle camera module, the camera module 7a is an ultra-wide-angle camera module, the camera module 7b is a wide-angle camera module, the camera module 7c is an ultra-wide-angle camera module, and the camera module 7d is a ToF (time of flight) camera module. In this embodiment, the camera modules 7, 7a have different fields of view, such that the electronic device 8 can have various magnification ratios so as to meet the requirement of optical zoom functionality. In addition, the camera module 7d can determine depth information of the imaged object. In this embodiment, the electronic device 8 includes multiple camera modules 7, 7a, 7b, 7c and 7d, but the present disclosure is not limited to the number and arrangement of camera modules.

When a user captures images of an object 86, the light rays converge in the camera module 7 or the camera module 7a to generate images, and the flash module 81 is activated for light supplement. The focus assist module 82 detects the object distance of the imaged object 86 to achieve fast auto focusing. The image signal processor 83 is configured to optimize the captured image to improve image quality. The light beam emitted from the focus assist module 82 can be either conventional infrared or laser. In addition, the light rays may converge in the camera module 7b, 7c or 7d to generate images. The user interface 84 can include a touch screen, and the user is able to interact with the user interface 84 and the image software processor 85 having multiple functions to capture images and complete image processing. Alternatively, the user may capture images via a physical button. The image processed by the image software processor 85 can be displayed on the user interface 84.

The smartphone in these embodiments is only exemplary for showing the imaging lens systems 1-6 of the present disclosure installed in the electronic device 8, and the present disclosure is not limited thereto. The imaging lens systems 1-6 can be optionally applied to optical systems with a movable focus. Furthermore, the imaging lens systems 1-6 feature good capability in aberration corrections and high image quality, and can be applied to 3D image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, having an object side, an image side and an optical axis, the image side being opposite to the object side, the optical axis passing through the object side and the image side, and the imaging lens system comprising:
   a plastic lens element, having:
      an object-side surface, facing the object side of the imaging lens system;
      an image-side surface, facing the image side of the imaging lens system, wherein the image-side surface is opposite to the object-side surface; and
      an outer annular surface, connected to the object-side surface and the image-side surface;
   a lens barrel, having an internal space for accommodating the plastic lens element, and the lens barrel comprising:
      a plate portion, having a light-passable hole, wherein the optical axis of the imaging lens system passes through the light-passable hole; and
      a lateral wall portion, connected to the plate portion, wherein the lateral wall portion extends from the plate portion along a direction substantially parallel to the optical axis, and the lateral wall portion corresponds to the outer annular surface of the plastic lens element; and
   a light-absorbing coating layer, fixed on the outer annular surface of the plastic lens element and being in physical contact with the lens barrel, and the light-absorbing coating layer having:
      an inner surface, facing and being fixed on the outer annular surface of the plastic lens element; and
      an outer surface, being opposite to the inner surface, wherein the outer surface is located farther away from the outer annular surface of the plastic lens element than the inner surface, and the outer surface is in physical contact with the lateral wall portion of the lens barrel;
   wherein a length of the outer surface of the light-absorbing coating layer that is in physical contact with the lateral wall portion of the lens barrel along a direction substantially in parallel with the optical axis is LA, a length of the inner surface of the light-absorbing coating layer along a direction substantially in parallel with the optical axis is LT, and the following condition is satisfied:

$$0.1 \leq LA/LT \leq 0.95.$$

2. The imaging lens system according to claim 1, wherein the plastic lens element comprises at least one axial connection structure located on at least one of the object-side surface and the image-side surface, and the at least one axial connection structure is configured to be connected to an adjacent optical element and to align the adjacent optical element with the optical axis.

3. The imaging lens system according to claim 2, wherein the light-absorbing coating layer extends from the outer annular surface to the at least one axial connection structure of the plastic lens element, and the inner surface of the light-absorbing coating layer is fixed on the at least one axial connection structure.

4. The imaging lens system according to claim 1, wherein the light-absorbing coating layer extends from the outer annular surface to the object-side surface and the image-side surface of the plastic lens element, and the inner surface of the light-absorbing coating layer is fixed on the object-side surface and the image-side surface.

5. The imaging lens system according to claim 1, wherein the light-absorbing coating layer extends from the outer annular surface to one of the object-side surface and the image-side surface of the plastic lens element, and the inner surface of the light-absorbing coating layer is fixed on the one of the object-side surface and the image-side surface.

6. The imaging lens system according to claim 1, wherein the light-absorbing coating layer extends from the outer annular surface and is fixed on at least one of the object-side surface and the image-side surface of the plastic lens element, a minimum thickness of a section of the light-absorbing coating layer fixed on the outer annular surface of the plastic lens element is dA1, a thickness of a section of the light-absorbing coating layer fixed on the object-side surface or the image-side surface of the plastic lens element is dC, and the following condition is satisfied:

$$0.97 < dA1/dC \leq 2.5.$$

7. The imaging lens system according to claim 6, wherein the minimum thickness of the section of the light-absorbing coating layer fixed on the outer annular surface of the plastic lens element is dA1, a maximum thickness of the section of the light-absorbing coating layer fixed on the outer annular surface of the plastic lens element is dA2, a difference between the maximum thickness dA2 and the minimum thickness dA1 is ΔdA, the thickness of the section of the light-absorbing coating layer fixed on the object-side surface or the image-side surface of the plastic lens element is dC, and the following condition is satisfied:

$$0.03 < \Delta dA/dC < 0.79.$$

8. The imaging lens system according to claim 1, wherein a minimum thickness of a section of the light-absorbing coating layer fixed on the outer annular surface of the plastic lens element is dA1, a maximum thickness of the section of the light-absorbing coating layer fixed on the outer annular surface of the plastic lens element is dA2, a difference between the maximum thickness dA2 and the minimum thickness dA1 is ΔdA, and the following condition is satisfied:

0.1 [um]<Δ*dA*<*dA*1.

9. The imaging lens system according to claim 8, wherein the minimum thickness of the section of the light-absorbing coating layer fixed on the outer annular surface of the plastic lens element is dA1, the maximum thickness of the section of the light-absorbing coating layer fixed on the outer annular surface of the plastic lens element is dA2, the difference between the maximum thickness dA2 and the minimum thickness dA1 is ΔdA, and the following condition is satisfied:

0.03<Δ*dA*/*dA*1<0.99.

10. The imaging lens system according to claim 1, wherein the light-absorbing coating layer extends from the outer annular surface and is fixed on at least one of the object-side surface and the image-side surface of the plastic lens element, and the outer surface at a section of the light-absorbing coating layer that is fixed on the at least one of the object-side surface and the image-side surface of the plastic lens element is in physical contact with an adjacent optical element.

11. The imaging lens system according to claim 1, wherein the plastic lens element has a trimmed surface located at a side thereof close to the outer annular surface, the trimmed surface is connected to the outer annular surface, a distance between the trimmed surface and the optical axis is smaller than a distance between the outer annular surface and the optical axis, and the plastic lens element comprises a gate trace on the trimmed surface.

12. The imaging lens system according to claim 11, further comprising an auxiliary light-absorbing coating layer, wherein the auxiliary light-absorbing coating layer has an inner surface and an outer surface, the inner surface of the auxiliary light-absorbing coating layer is fixed on the gate trace, and the outer surface of the auxiliary light-absorbing coating layer is spaced apart from the lens barrel.

13. A camera module, comprising:

the imaging lens system of claim 1.

14. An electronic device, comprising:

the camera module of claim 13; and an image sensor, disposed on an image surface of the imaging lens system.

* * * * *